United States Patent [19]
Nakagawa et al.

[11] Patent Number: 5,987,556
[45] Date of Patent: Nov. 16, 1999

[54] DATA PROCESSING DEVICE HAVING ACCELERATOR FOR DIGITAL SIGNAL PROCESSING

[75] Inventors: Tetsuya Nakagawa, Koganei; Haruyasu Okubo; Atsushi Kiuchi, both of Higashimurayama, all of Japan

[73] Assignee: Hitachi, Ltd., Tokyo, Japan

[21] Appl. No.: 09/092,940

[22] Filed: Jun. 8, 1998

[30] Foreign Application Priority Data

Jun. 10, 1997 [JP] Japan .................................. 9-151734

[51] Int. Cl.[6] ...................................................... G06F 9/46
[52] U.S. Cl. ............................ 710/129; 710/260; 712/35
[58] Field of Search ................................... 710/129, 260; 712/35

[56] References Cited

U.S. PATENT DOCUMENTS

| | | | |
|---|---|---|---|
| 5,121,479 | 6/1992 | O'Brien .................................. | 710/34 |
| 5,129,072 | 7/1992 | Larner et al. ........................... | 710/48 |
| 5,369,767 | 11/1994 | Dinwiddie, Jr. et al. .............. | 710/264 |
| 5,579,493 | 11/1996 | Kiuchi et al. .......................... | 712/200 |
| 5,822,553 | 10/1998 | Gifford et al. ......................... | 710/129 |

Primary Examiner—Ayaz R. Sheikh
Assistant Examiner—Frantz Blanchard Jean
Attorney, Agent, or Firm—Beall Law Offices

[57] ABSTRACT

A data processing device uses a processor such as a central processing unit and a special-purpose hardware circuit, such as an accelerator for accelerating the software operation using the operation program of the processor by replacing the software operation partially by the hardware. A practical application of this processor arrangement is found in mobile communication terminal devices including a digital cellular portable telephone in which a digital signal processor of a mobile communication terminal device operates in association with an accelerator for accelerating specific signal processings such as waveform equalization. The processor provides input data to the accelerator and the results of operation by the accelerator are output to a register or memory based on a cycle of operation to be read periodically by the processor. When the processor operates in association with the accelerator and is interrupted, the data output to the memory of the accelerator cannot be read by the processor and a clock control circuit is used for stopping the internal clock signal of the accelerator for stopping its operation. This avoids the potential for the operation of the accelerator to overwrite the output stored in the output register of the accelerator before it is read by the processor. The processor cannot read the output register of the accelerator while it processes an interrupt or when it loses ownership of the bus connecting the processor to the accelerator.

42 Claims, 24 Drawing Sheets

CLOCK STOP POSITION

DATA PROCESSING DEVICE HAVING ACCELERATOR FOR DIGITAL SIGNAL PROCESSING

FIELD OF THE INVENTION

The present invention relates to a data processing device using processor means such as a central processing unit and a special-purpose hardware (hereinafter referred to also as an accelerator) for accelerating the software operation using the operation program of the processor means by replacing the software operation partially by a hardware, and further to a mobile communication terminal device including a digital cellular portable telephone. For example, the invention relates to a technique which is effective when applied to a control technique for associating the processings of a digital signal processor (hereinafter referred to also as a DSP) constituting a mobile communication terminal device and an accelerator for accelerating specific signal processings such as waveform equalization.

BACKGROUND OF THE INVENTION

A processor, represented by a general-purpose microprocessor, a microcomputer or a DSP, can process data according to an operation program. A DSP is a processor which is specialized in digital signal processing. For example, the operation of a mobile communication terminal device is roughly divided into digital signal processings such as speech encoding/decoding, and modulation/demodulation and a communication protocol processing. Because of the property of the digital signal processing, the former is suitably realized by special-purpose hardware or a programmable DSP. Meanwhile, the latter communication protocol processing is so complicated that it is more suitably realized by software using a high-level language such as the C language. Based on this fact, there has been proposed a method in which the speech encoding/decoding, the channel encoding/decoding, and the modulating/demodulating of the base band processings of a mobile communication terminal device are realized by a DSP whereas the communication protocol processing is realized by a general-purpose microprocessor.

At present, many mobile communication terminal devices are so constructed as to include two processors, i.e., a DSP and a general-purpose microprocessor, as has been described hereinbefore. Meanwhile, a processor (hereinafter referred to also as an integrated processor), in which a DSP and a general-purpose microprocessor are integrated, has been manufactured to realize a mobile communication terminal device. Such an integrated processor is represented by the product SH-DSP (SH7410) made by Hitachi Ltd. This integrated processor can execute an operation while performing the read of a program and the transfer of two data simultaneously, so that it is suitable for digital signal processings such as speech encoding/decoding, channel encoding/decoding and waveform equalization.

Even when a DSP, a general-purpose microprocessor and an integrated processor are employed, however, the digital signal processings such as speed encoding/decoding, channel encoding/decoding and waveform equalization are realized as the processings depending exclusively upon the software over the DSP or the integrated processor. The contents of the processings depending exclusively upon the software vary according to the contents of the operation program but are not expected to cope with the high speed operation sufficiently as the quantity of processings increases. For example, the construction of a mobile communication terminal device is mainly for realizing existing speech communication service. Fast data service is expected to become the main stay in the mobile communication systems of the next generation. For fast data service, more data has to be transmitted than that of the existing case of only speech transmission. Thus, as the signal processing increase in proportion to the amount of transmission this imposes a heavy burden on the mobile communication terminal device. This signal processing includes waveform equalization and channel decoding. In the existing speech transmission service, such processing is performed by software with a programmable processor such as a DSP mounted in a terminal device. However, the processing ability of the processor is not sufficient for coping with fast data service expected to be required of the next generation mobile communication terminal devices.

SUMMARY OF THE INVENTION

Here, the contents of the waveform equalization and the channel decoding, realized at present by software, comprise two kinds of processings having different properties. That is to say, processings in which the quantity is much though the processings are simply repeated, and processings in which the quantity of processing is not so much though the processings are complicated. The former kind is suitably realized by hardware whereas the latter kind is suitably realized by software. It is, therefore, conceivable to realize the former processings by an accelerator or hardware mounted in the chip where a processor is also mounted, so that the entirety is realized by associating the processings of the accelerator with the software processings by the processor.

In this example, the aforementioned accelerator is positioned as a peripheral circuit for the processor core of the processor (the CPU unit in a general-purpose microprocessor, the DSP engine in a DSP or the CPU unit and the DSP engine in an integrated processor). The accelerator processes data by using an operation circuit specialized for a specific digital signal processing such as waveform equalization, so that the operation result appears in the output register of the accelerator after every predetermined cycle from the write of data in the input register. The processor core reads the operation result data, appearing in the output register after every predetermined cycle, sequentially from the output register and transfers it to an on-chip memory or the like. Normally one cycle is necessary for the processor core of the processor to read/write the on-chip register or the on-chip memory. In other words, two cycles are necessary for the processor to read the output register and to write the on-chip memory, for example. In this case if the throughput of the accelerator is two cycles or more, the processor core can fetch the operation result and transfer it to the on-chip memory. This makes it possible to perform the processings of the accelerator and the processings of the processor core in parallel thereby to improve the overall performances of the data processing such as the waveform equalizations by the processor.

However, it has been found that the following problems arise if an interrupt request having a high priority occurs in a processor while the processor core acquires a series of operation results. Specifically, while the processor is processing an interrupt request of high priority, the next operation result is overwritten in the output register of the accelerator. This causes a failure to fetch the operation result of the accelerator. In a mobile communication terminal device such as a digital cellular portable telephone, an interruption of high priority is typically issued as a result of the transfer of transmitted/received data or speech data through a high-frequency circuit. These data have to be transferred with the highest priority to the processor.

When an interrupt request of high priority occurs and the processor cannot read the output register of the accelerator, a failure to fetch the operation result has to be prevented by stopping the operation of the accelerator temporarily. In other words, the operation of the accelerator is temporarily stopped while the processor is executing the processing of high priority. After the end of this processing of high priority, the operation of the accelerator is resumed. When the operation of the accelerator is synchronized with an operating clock signal of the processor, the input of the clock signal to the accelerator may be temporarily stopped to stop the operation of the accelerator.

Processors such as an integrated processor or a DSP are so constructed as to control the feed of the clock signal to an on-chip peripheral module such as an accelerator. This clock control is intended to suppress the overall power consumption of the chip while the peripheral module is inactive, by selectively stopping the feed of the clock signal to the on-chip module. For this clock control, there is prepared one integrated clock control register in the processor. Each bit in this register corresponds to each on-chip peripheral module. When the processor core writes a value "1" in a bit of the register, the clock signal is fed to the corresponding peripheral module. When a value "0" is written, the feed of the clock signal is stopped.

However, the clock control cannot block the potential for the processor core failing to take in the operation result of the accelerator when an interruption occurs. This is because when the processor accepts the interruption, the operation of the processor core is branched to interrupt processing, and access to the clock feed register cannot be made any longer, failing to stop the feed of the clock signal. Since the interruption occurs asynchronously with the operation of the processor, the feed of the clock signal cannot be stopped in advance, in anticipation of the occurrence of the interruption. The problem thus far described with respect to receiving an interrupt also occurs when the processor core aborts a bus right (bus ownership) on the basis of the bus right demand of another bus master module.

An object of the invention is to provide a data processing device capable of preventing an incident in which processor fails to fetch the operation result produced by a processing circuit or hardware circuit operating in association with the processor even if the processor is interrupted or loses ownership of the bus and its operation executed in association therewith is stopped.

Another object of the invention is to provide a mobile communication terminal device capable of performing a fast processing corresponding to an increase in the quantity of processing by using a processing circuit or a hardware circuit as an accelerator means operating in association with a processor.

The outline of a representative embodiment of the invention to be disclosed herein will be briefly described in the following.

Specifically, a data processing device comprises processor means (120) for executing an instruction in synchronism with a clock signal and hardware means, such as special-purpose hardware means (200), associated with the processor means for performing a specific operation in synchronism with the clock signal. The special-purpose hardware means includes a clock control circuit (206) for stopping the internal clock signals (CLK1, CLK2) for synchronizing its operation when the processing by the processor means is interrupted.

The control modes for stopping the internal clock signal of the special-purpose hardware means can be classified into the following three modes, for example. In the first mode, the internal clock signal is stopped in synchronism with an interrupt generated by an interrupt signal (INT) sent to the processor means and fed to the operation control means. In the second mode, the internal clock signals are stopped when the processor means is instructed to abort the bus right by the bus arbitration signal (BRDY1). In the third mode, the operation control means stops the internal clock signal automatically at each interval to read the operation result from the special-purpose hardware means. A description in more detail of the individual modes is as follows.

A data processing device operating according to the first mode includes a clock control circuit (206) for stopping the internal clock signals (CLK1, CLK2), when the processor means is instructed to process an interrupt by an interrupt signal (INT). For example, the clock control circuit includes a memory circuit such as a flip-flop circuit (255) for enabling the internal clock signal to continue in a first state and for stopping the internal clock signal in a second state, and the flip-flop circuit is brought into the second state by an interrupt instruction by the interrupt signal.

The special-purpose hardware means (200) can include, for example, an input register (222) accessed by the processor means (120); operation circuits (223, 224, 225, 231) for executing operations with the data, which is written in the input register, in synchronism with the internal clock signals; and an output register (226) adapted to be loaded with the operation result made by an operation circuit.

At this time, the flip-flop circuit can be brought into the first state in synchronism with the write of the data in the input register by the processor means. As a result, even when the internal clock signals are stopped, the special-purpose hardware means is brought into an active state by resuming the internal clock signals in association with or in response to the write of the data to be processed. Moreover, the flip-flop circuit can be brought into the first state in synchronism with the read of the data from the output register by the processor means. As a result, even when the internal clock signals are stopped, the special-purpose hardware means is brought into an active state by resuming the internal clock signals in association with or in response to the read of the operation result data.

The processor means and the special-purpose hardware means can be formed as a processor on a single semiconductor substrate.

The data processing device according to the second mode has bus master means (131) other than the processor means, and bus arbitration means (130) for arbitrating the bus right between the processor means and the bus master means. At this time, a clock control circuit (206) stops the internal clock signal for synchronizing the specific operation, when the processor means is instructed to abort the bus right (disconnect itself from the bus) by a bus arbitration signal (BRDY1). The clock control circuit includes, for example, a flip-flop circuit for enabling the internal clock signal to continue in a first state,signal for stopping the internal clock signal in a second state. The flip-flop circuit is brought into the second state by a bus disconnect instruction (bus right abort) by the bus arbitration signal fed to the processor means. The flip-flop circuit is brought into the first state by a bus connect instruction by the bus arbitration signal, which is fed to the processor means.

A data processing device related to the third mode comprises processor means (120) for executing an instruction in synchronism with a clock signal; and special-purpose hardware means (200) associated with the processor means for performing a specific operation in synchronism with the clock signal. The special-purpose hardware means includes a clock control circuit (206) for stopping the change in internal clock signals (CLK1, CLK2) for synchronizing the specific operation; an input register (222) accessed by the processor means; operation circuits (223, 224, 225, 231) for executing operations on the data, which are written in the input register, in synchronism with the internal clock signal; and an output register (226) adapted to be loaded with the operation result made by the operation circuit. The clock control circuit includes a flip-flop circuit (255) for enabling the internal clock signal to continue in a first state and for stopping the internal clock signal in a second state; and counter means (292, 293, 296, 298) for counting the rewrite interval of the output register by the operation result of the operation circuit. The flip-flop circuit can be brought into the second state in synchronism with the count-up of the rewrite interval by the counter means.

The flip-flop circuit can also be brought into the first state in synchronism with the data read of the output register by the processor means.

A mobile communication terminal device can be so constructed as to comprise the data processing device used for communication protocol processing, channel encoding/decoding and modulating/demodulating; a high-frequency modulation/demodulation means; and an analog front end unit disposed between the data processing means and the high-frequency modulation/demodulation means.

The foregoing and other objects and novel features of the invention will become apparent from the following description to be made with reference to the accompanying drawings.

DETAILED DESCRIPTION OF THE PREFERRED EMBODIMENTS

The detailed description of the preferred embodiments begins with a practical application of the invention to a mobile communication system, but the invention is not limited to this application.

Figure 15:
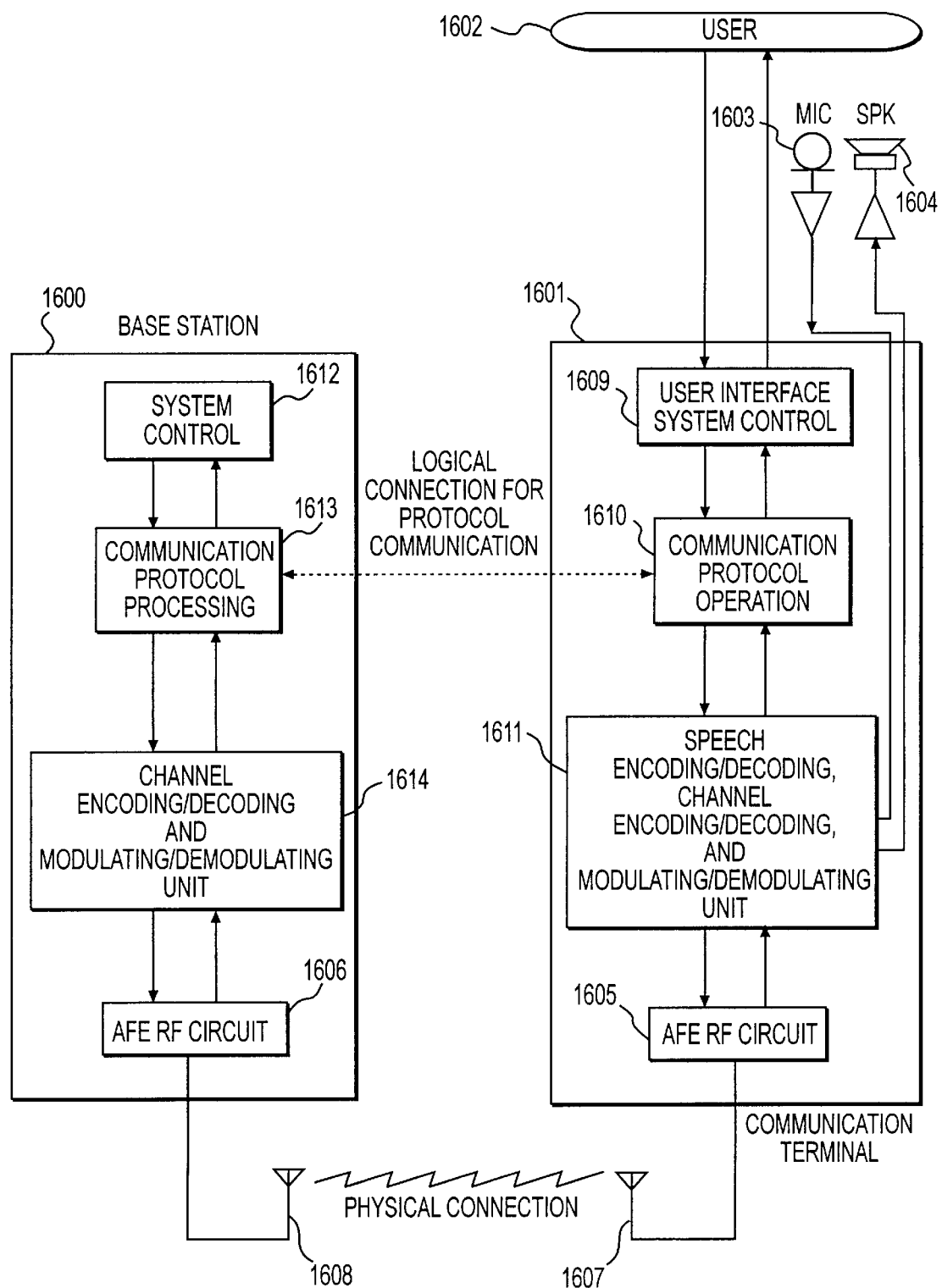
FIG. 15 is a block diagram showing a mobile communication system.

FIG. 15 shows a mobile communication system schematically. In FIG. 15, there are shown a user 1602, a mobile communication terminal device (hereinafter also referred to simply as a communication terminal) 1601 and a base station 1600. The user 1602 makes access to the base station 1600 by using the communication terminal 1601 to receive various services. Communication with another communication terminal is also performed through the base station 1600, and the communication processing between the communication terminal and the base station is the same.

The communication terminal 1601 is so constructed as to include a user interface system control unit 1609, a communication protocol processing unit 1610, a speech encoding/decoding, channel encoding/decoding and modulating/demodulating unit 1611, and an analog front end (AFE)/RF circuit 1605. The base station 1600 is so constructed as to include a system control unit 1612, a communication protocol processing unit 1613, a channel encoding/decoding and modulating/demodulating unit 1614, and an analog front end (AFE)/RF circuit 1606.

The communication terminal 1601 transmits/receives data to/from the base station 1600 generally in the following two ways. One is to transfer the user's data such as speech, and the other is to transfer the control data for the system operation. Numeral 1604 designates a speaker.

The speech data transfer is performed in the following manner. The speech data, input through a microphone 1603, is converted into digital data and is then compressed by the speech encoding processing of the processing unit 1611. The error correcting information is added to the compressed speech data and the resultant data are then modulated by the processing unit 1611. These processings are executed in the digital region. The modulated digital speech is converted into analog data by the analog front end (AFE) of the processing unit 1605 and is transmitted from an antenna by the RF circuit while being carried by radio waves of high frequency. The radio waves are once demodulated after they are received by an antenna 1608 of the base station 1600. The demodulated radio waves are modulated again with the frequency (in the case of the frequency division multiplex) allotted to the communication party and are transmitted again from the base station to the communication party at the timing of the time slot (in the case of time division multiplex) allotted to the communication party.

For the case where the control data for operating the system are transmitted/received, information is exchanged between the communication protocol processing unit 1610 in the communication terminal 1601 and the communication protocol processing unit 1613 in the base station 1600. A virtual logic connection is established in between. The virtual logic connection is realized by the following physical connection.

For example, the base station 1600 gives an instruction to the communication terminal in the following manner. The instruction data according to a predetermined protocol are subjected to channel encoding and modulation by the processing unit 1614. The data are then converted into analog data by the analog front end (AFE) of the processing unit 1606 and are transmitted from the antenna 1608 while being carried by radio waves by the RF circuit. The radio waves are received by the antenna 1607 of the communication terminal 1601 and are then converted into digital data of a base band through the RF circuit and the analog front end (AFE) of the processing unit 1605. The digital data are subjected to demodulation and channel decoding by the processing unit 1611 and are transferred to the communication protocol processing unit 1610.

The two ways of exchanging signals between the communication terminal 1601 and the base station 1600 and the related processings have already been summarized. The related processings can be roughly divided into two kinds. The channel encoding/decoding and modulating/demodulating are classified into digital signal processings and are suitable for implementation by hardware, such as a special-purpose or programmable digital signal processor (DSP). Meanwhile, the communication protocol processing is extremely complicated and is suitable to be realized by software employing a high-level language such as the C language.

Of the base band processings of the mobile communication terminal device, the channel encoding/decoding and modulating/demodulating can be performed by the DSP, and the communication protocol processing can be realized by the general-purpose microprocessor.

Figure 16:
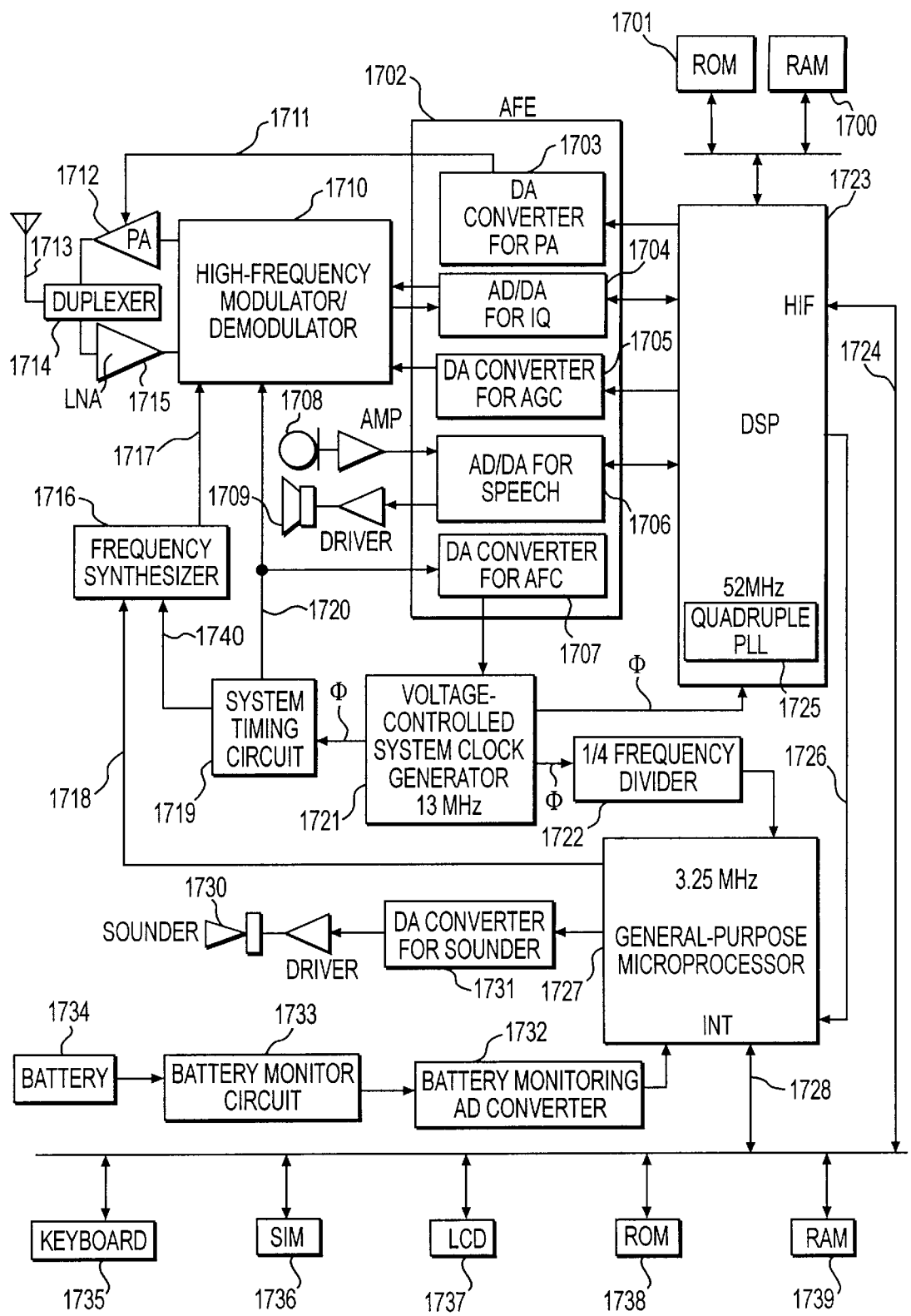
FIG. 16 is a block diagram showing one example of a GSM mobile communication terminal device which includes a DSP and a general-purpose microprocessor.

FIG. 16 shows one example of the mobile communication terminal device which is constructed by using the DSP and the general-purpose microprocessor.

This mobile communication terminal device is dedicated for the GSM (Global System for Mobile Communications) which is used for the digital cellular telephone of Europe. The mobile communication terminal device of FIG. 16 is so constructed as to include a DSP 1723, a RAM (Random Access Memory) 1700 for the DSP, a ROM (Read Only Memory) 1701 for the DSP, a general-purpose microprocessor 1727, an analog front end AFE 1702 for the base band, a high-frequency modulator/demodulator 1710, a power amplifier (PA) 1712, an antenna 1713, a duplexer 1714, a low-noise amplifier (LNA) 1715, a microphone 1708, a loud speaker 1709, a frequency synthesizer 1716, a system timing circuit 1719, a voltage control system clock 1721, a ¼ frequency divider 1722, a sounder DA converter 1731, a sounder 1730, a battery monitoring AD converter 1732, a battery monitor circuit 1733, a battery 1734, a RAM 1739 for the general-purpose microprocessor, a ROM 1738 for the general-purpose microprocessor, a liquid crystal display (LCD) 1737, a SIM (Subscriber Identity Module) 1736 and a keyboard 1735.

At the time of speech transmission, the speech input from a microphone 1708 is amplified and is then sampled and converted into digital data by a speed AD converter 1706. This sampling rate is 8 KHz, and the bit accuracy is 13 bits. The digitized data are sent to the DSP 1723, subjected to compression encoding and channel encoding, and transferred again to an I/Q DA converter 1704 of the analog front end AFE 1702. The data are modulated and converted into analog data by the D/A converter 1704 and are inputted to the high-frequency modulator/demodulator 1710. Then, the analog data are carried by the RF frequency (about 800 MHz) and transmitted from the antenna 1713. The duplexer 1714 is employed for separating the input radio waves and the output radio waves. High-frequency sinusoidal waves 1717 employed for the high-frequency modulation/demodulation are synthesized by the frequency synthesizer 1716. The ROM 1701 is stored with programs to be executed in the DSP 1723, and the RAM 1700 is provided for the work of the DSP 1723.

At the time of speech reception, the data received by the antenna 1713 are input through the low-noise amplifier LNA 1715 to the high-frequency modulator/demodulator 1710. Here, the data are converted into low-frequency base band analog signals and are transferred to the I/Q AD converter 1704 of the analog front end (AFE) 1702. The data sampled and converted to digital data are sent to the DSP 1723, and subjected to demodulation, channel decoding and compression decoding. After this, the data are converted into analog data by the speech DA converted 1706 and are outputted from the loudspeaker 1709.

The user employs the keyboard 1735 and the LCD 1737 to make a telephone call. The SIM 1736 is a detachable user ID module, so that the terminal can be dedicated to the user by mounting the SIM 1736 on the communication terminal. The ROM 1738 is stored therein with the program to be executed in the general-purpose microprocessor 1727, and the RAM 1739 is for the work of the general-purpose microprocessor 1727. The battery 1734 is the main battery for the entirety of this terminal, and the remaining capacity is monitored by the general-purpose microprocessor 1727 through the battery monitoring circuit 1733 and the battery monitoring AD/converter 1732. When a telephone call is made, the general-purpose microprocessor 1727 operates the sounder 1730 through a sounder DA converter 1731.

A fundamental clock ø (13 MHz) of the mobile communication terminal device is fed from the voltage control system clock generator 1721. In response to this fundamental clock ø, the system timing circuit 1719 generates and distributes the system timing signals 1740 and 1720 into the terminal. The fundamental clock ø is also fed to the DSP 1723 and the general-purpose microprocessor 1727. It is said that the DSP of the GSM needs to have an operating speed of 20 to 50 MIPS (Mega Instruction Per Second) for the processing. In FIG. 16, the DSP operates at 52 MHz or four times as large as the fundamental clock 13 MHz by using a PLL (Phase Locked Loop) circuit 1725 mounted in the DSP 1723. Meantime, it is said that the CPU of the general-purpose microprocessor in the GSM needs to have an operating speed of 1 to 2 MIPS for the processing. In FIG. 16, therefore, the ¼ frequency divider 1722 generates 3.25 MHz or a quarter of a fundamental clock ø (13 MHz), and the general-purpose microprocessor is activated at this rate.

The fundamental clock ø of the mobile communication terminal device has to match the master clock (13 MHz) of the base station strictly in frequency. This matching is effected in the following manner. First, the strict frequency information is received from the base station. On the basis of this information, the DSP 1723 controls the voltage control system clock generator 1721 through an AFC (Auto Frequency Control) DA converter 1707 to adjust the frequency. An instruction of output power level of the terminal may be sent from the base station. At this time, the DSP 1723 drives a PA (Power Amplifier) DA converter 1703 to adjust the output of the power amplifier 1712 with a power amplifier control signal 1711. Further, on the basis of the amplitude information of the received signal, the DSP 1723 adjusts the gain of the radio-frequency modulator/demodulator 1710 through an AGC (Auto Gain Control) DA converter 1705.

The communication between the DSP 1723 and the general-purpose microprocessor 1727 is performed in the following manner. The DSP 1723 is connected through an HIF (Host InterFace) 1724 with the external bus 1728 of the general-purpose microprocessor. This general-purpose microprocessor 1727 can read/write the internal resource of the DSP freely from the HIF 1724. The DSP 1723 uses an interrupt signal 1726 when it is to communicate with the general-purpose microprocessor 1727.

In FIG. 16, the mobile communication terminal device is so constructed as to include two processors, i.e., the DSP 1723 and the general-purpose microprocessor 1727. Moreover, the DSP 1723 and the general-purpose microprocessor 1727 can be constructed in an integrated processor in which the two are provided in one chip. At this time, the integrated processor can have the ROM and the RAM on the chip.

Figure 17:
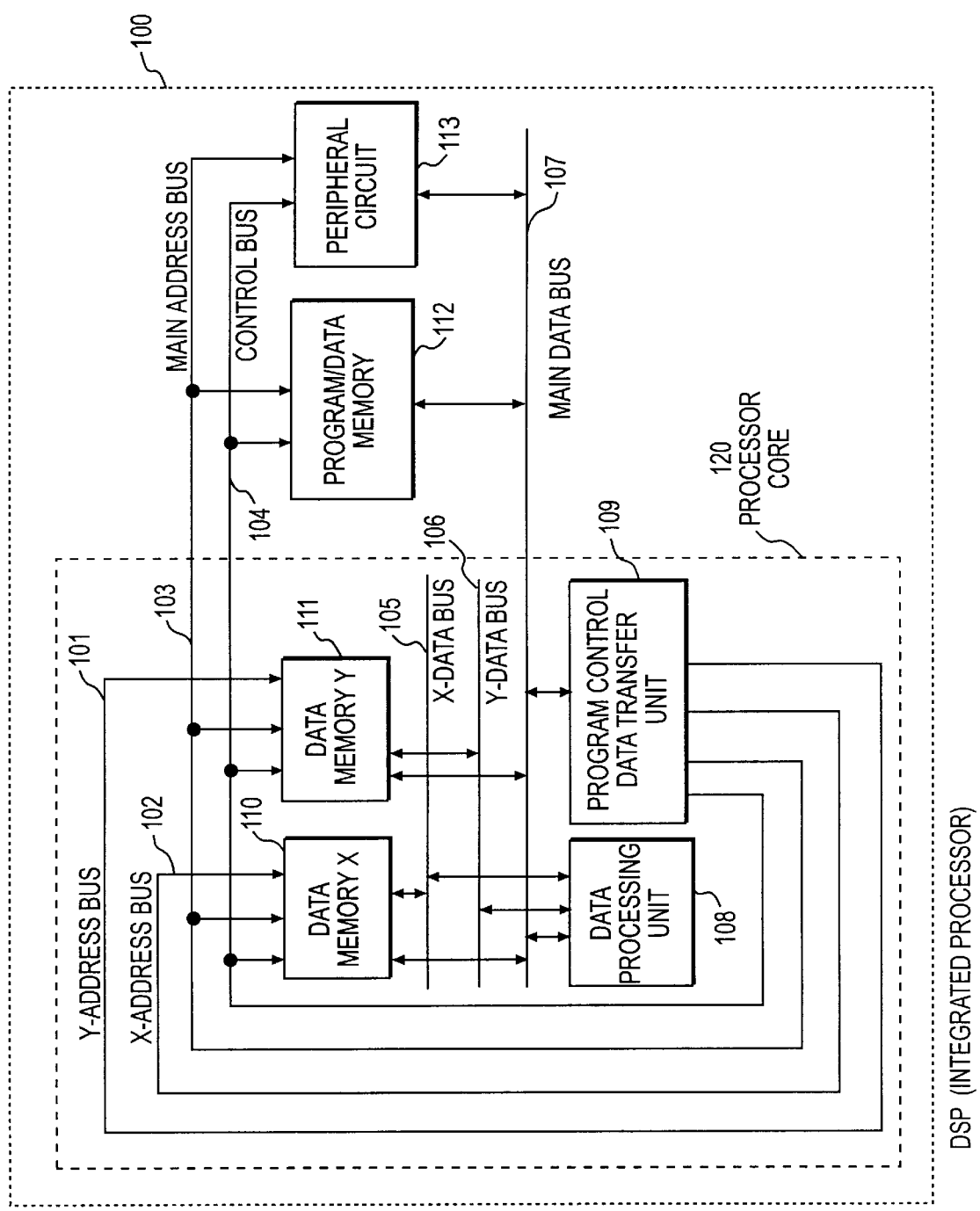
FIG. 17 is a block diagram showing one example of a processor such as a DSP or an integrated processor.

FIG. 17 shows an example of the internal construction of the DSP or the integrated processor. A processor 100, as shown in FIG. 17, is so constructed as to include a data processing unit 108, a program control/data transfer unit 109, a data memory X 110, a data memory Y 111, a program/data memory 112, a peripheral circuit 113, an X-address bus 102, a Y-address bus 101, a main address bus 103, a control bus 104, an X-data bus 105, a Y-data bus 106 and a main data bus 107.

In the construction of FIG. 17, the data processing unit 108, the program control/data transfer unit 109, the data memory X 110 and the data memory Y 111 constitute together a processor core 120. This processor core 120 is the CPU unit in the case of the general-purpose microprocessor, the DSP core in the case of the DSP, and the CPU unit and the DSP engine in the case of the integrated processor. The CPU unit is one for fetching an instruction, decoding the fetched instruction, and operating the register and the integer operator in accordance with the decoding result to execute the instruction. The DSP engine is one for receiving a command or a control signal to execute the digital signal processing, as instructed by the control signal, by using a product-sum operating unit.

FIG. 17 shows only the core portion of the processor 100 in detail. On an actual processor, there are mounted peripheral circuits including an interrupt controller, a bus arbiter and DMAC (Direct Memory Access Controller). These are shown altogether as the peripheral circuit 113 in FIG. 17.

The processor 100 reads a program stored in the program/data memory 112, stores it in the program control/data transfer unit 109 through the main data bus 107 decodes the read data, and executes the program. The address of the program read at this time is fed from the program control/data transfer unit 109 through the main address bus 103 to the program/data memory 112.

The processor 100 can feed data in two ways to the data processing unit 108 simultaneously with the aforementioned read of the program. Specifically, on the one hand, data stored in the data memory X 110 is transferred through the X-data bus 105 to the data processing unit 108, and on the other hand, data stored in the data memory Y 110 can be transferred through the Y-data bus 106 to the data processing unit 108. The addresses of both the read data are fed to the data memory X 110 and the data memory Y 111, respectively, through the X-address bus 102 and the Y-address bus 101 from the program control/data transfer unit 109.

The processor 100, as shown in FIG. 17, is utilized for the signal processing of a large quantity of operation such as waveform equalization or channel decoding no matter whether it is the DSP or the integrated processor.

The contents of such waveform equalization or channel decoding comprise two kinds of different characters. That is, the processings having large quantities of operation although simply repeated, and the processings having not so large quantities of operation although complicated. The former processings are suitably realized by hardware whereas the latter processings are preferably realized by software. Therefore, the former processings can be realized by an accelerator of the hardware mounted on the same chip as that of the processor 100, in association with the software processings by the processor core 120. The accelerator can be positioned as one peripheral circuit 113 of FIG. 17.

In the mobile terminal device such as a GSM, as shown as in this embodiment, the electric power is supplied by a built-in battery, and it is an important problem to lower the power consumption. To achieve such low power consumption, it is effective to suppress the operating frequency of the DSP or the integrated processor to a low value. This suppression of the operating frequency makes it difficult to execute the processing of a large quantity of operations by the software processing. Therefore, for a mobile terminal device in which the electric power is supplied by a built-in battery, it is extremely effective to lower power consumption by performing part of the internal signal processings by the accelerator of the hardware which is mounted on the same chip as that of the processor.

Figure 18:
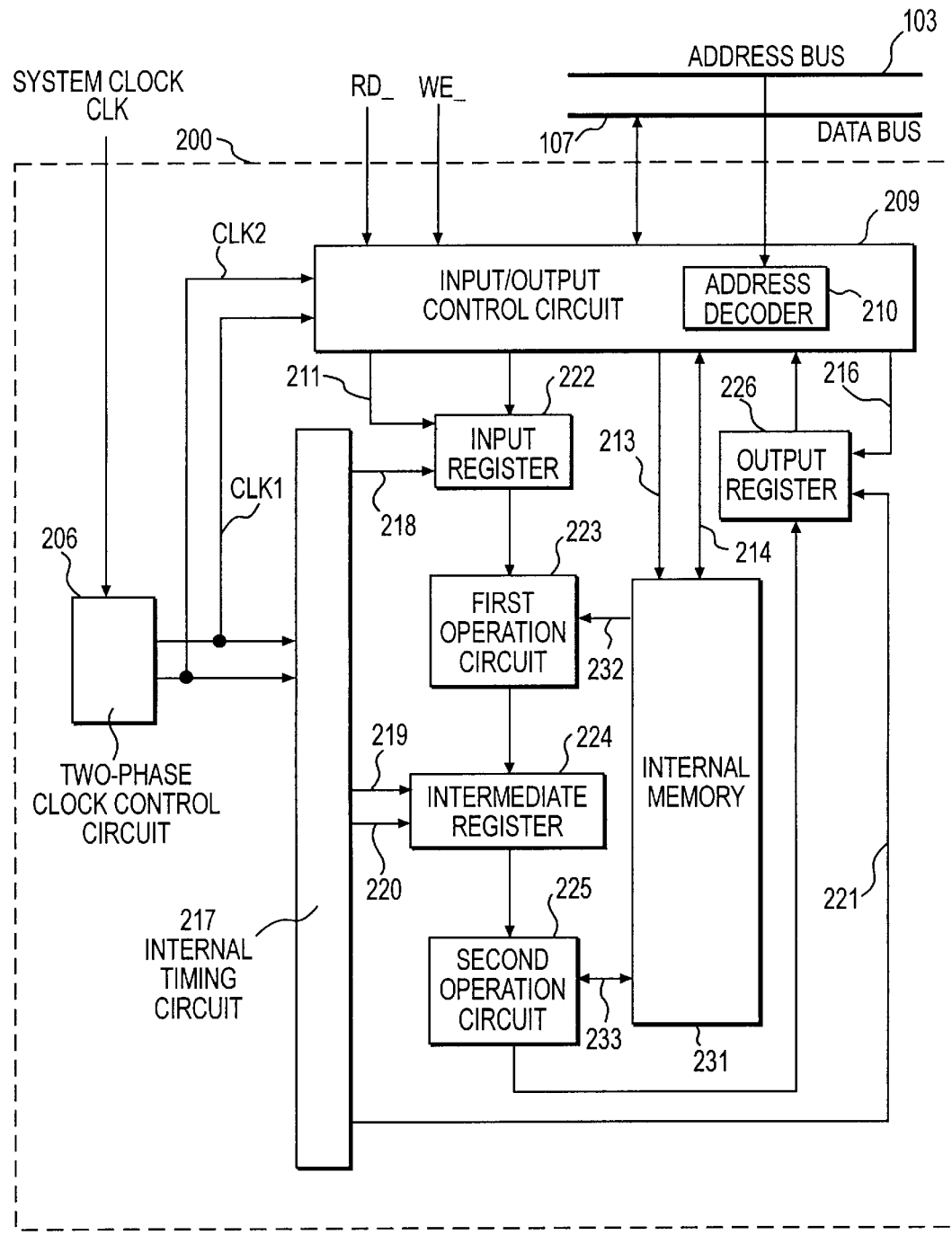
FIG. 18 is a block diagram showing one example an accelerator included in the processor of FIG. 17.

FIG. 18 shows an example of the accelerator. This accelerator 200 of FIG. 18 is dedicated to the aforementioned waveform equalization, for example. The accelerator 200 of FIG. 18 is so constructed as to include an input register 222, a first operation circuit 223, an intermediate register 224, a second operation circuit 225, an output register 226, an input/output control circuit 209, an address decoder 210, an internal timing circuit 217, an internal memory 231 and a two-phase clock control circuit 206. The accelerator 200 of FIG. 18 is connected to the control bus 104, the main data bus 107 and the main address bus 103 of the processor 100, as shown in FIG. 17. The accelerator 200 is connected as one peripheral circuit 113 of the processor 100 of FIG. 17.

Figure 19:
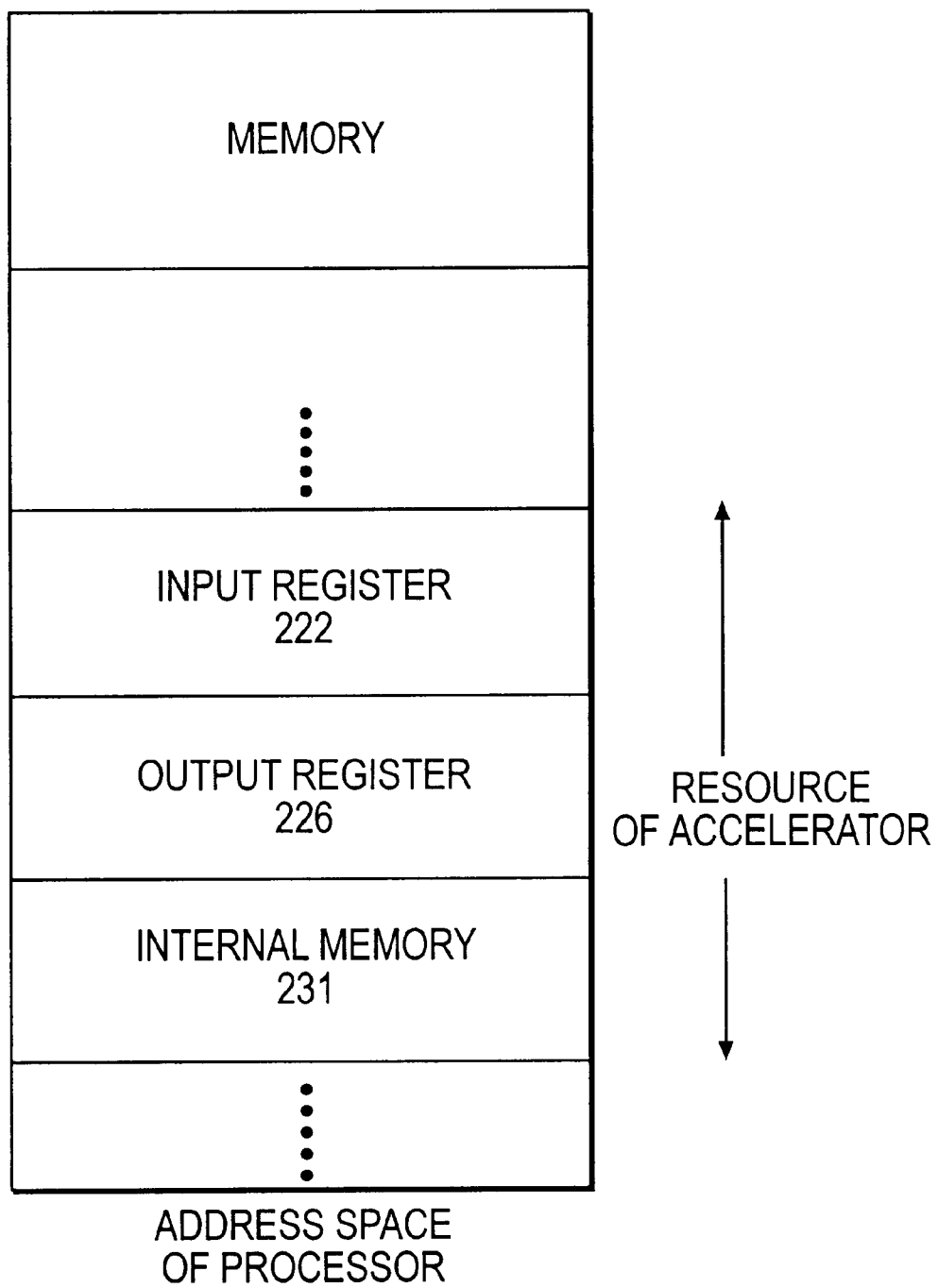
FIG. 19 is an address map illustrating one example of the memory space of the processor of FIG. 17.

In FIG. 19, there is shown the resource of the accelerator 200 of FIG. 18, mapped in the memory space of the processor 100 of FIG. 17. The resource of the accelerator 200 includes an input register 222, an output register 226 and an internal memory 231, which are accessed by the processor 130 by reading the corresponding addresses of the memory space.

The processor core 120 of the processor 100 writes data necessary for the internal memory 231 and initializes the state variables necessary for processings, before it starts the accelerator 200. The processor core 120 of the processor 100 makes access to the input register 222, the output register 226 and the internal memory 231 through the input/output control circuit 209. The resource to be accessed is selected with the address. This address is decoded through the address bus 204 by the address decoder 210, and the decoded signal is employed as a select signal for the input register 222 and the output register 226 in the input/output control circuit 209. The accelerator 200 is started by data write performed by the processor core 120 of the processor 100 in the input register 222 through the input/output control circuit 209.

The accelerator 200 is operated synchronously with non-overlapping two-phase clock signals CLK1 and CLK2, which will be detailed hereinafter. These clock signals CLK1 and CLK2 are generated by the two-phase clock control circuit 206 on the basis of a system clock signal CLK. The two-phase clock control circuit 206 feeds/stops the clock signals CLK1 and CLK2 on the basis of the clock stop control signal and the interrupt signal to the processor core 120, which will be detailed hereinafter. In FIG. 18, reference numerals 218, 220 and 216 designate output timing signals for the registers 222, 224 and 226, and numerals 211, 219 and 221 designate input timing signals of the registers 222, 224 and 226, respectively. Numerals 232 and 233 designate data signal lines connecting the internal memory 231 and the operation circuits 223 and 225, respectively. The input/output control circuit 209 makes an access to the internal memory 231 through a data line 214 and an address line 213. In FIG. 18, there are representatively shown a read signal RD__ and a write enable signal WE__ which are contained in the control bus 104 of FIG. 17.

The accelerator 200 of FIG. 18 starts its operation, when one data is written in the input register 222, to generate eight output data in total by using the data of the internal memory 231. It takes three cycles for both the first operation circuit 223 and the second operation circuit 222 to execute the operations. After 3 cycles from the write of one data in the input register 222, the first operation circuit 223 outputs first intermediate data to the intermediate register 224. Thereafter, the first operation circuit 223 updates the intermediate register 224 after every 3 cycles.

After 3 cycles of the write of the first intermediate data in the intermediate register 224, the second operation circuit 225 outputs the first output data to the output register 226. Thereafter, the second operation circuit 225 updates the output register 226 after every 3 cycles. The timing signal necessary to update the intermediate register 224 and the output register 226 after every 3 cycles is fed by the internal timing circuit 217.

The waveform equalization to be conducted by the accelerator 200 is similar to the known processing of decoding convolution codes, and the first operation circuit 223 conducts the branch metric processing whereas the second operation circuit 225 conducts the add compare select processing. These processings are adaptive type automatic equalizations to cancel the influences of the phasing before the demodulation.

There may be processings to be performed in the accelerator that include not only waveform equalization but also error correction and motion picture compression/decompression.

Figure 20:
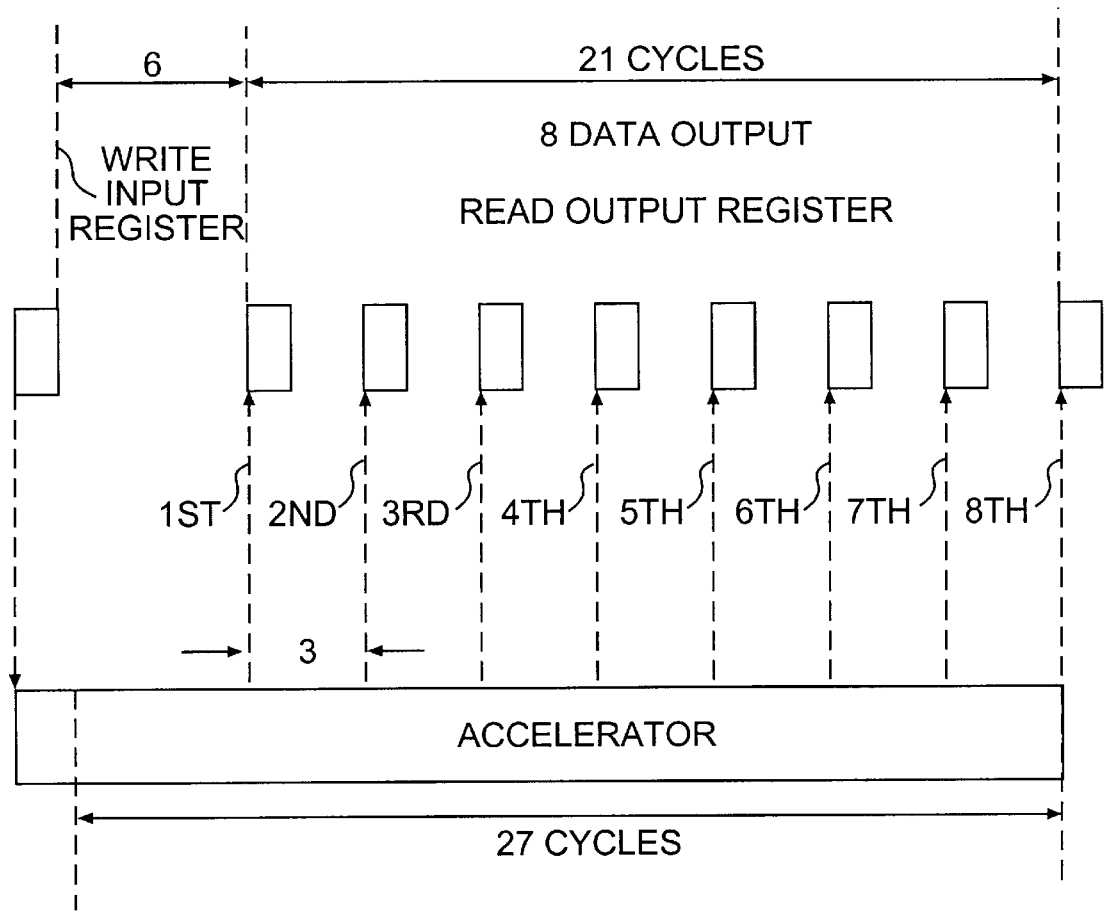
FIG. 20 is a timing chart illustrating the timing of the data input/output of the accelerator of FIG. 17.

FIG. 20 illustrates the overall timing of the data input/output to/from the accelerator 200. After 6 cycles from the write of one data in the input register 222, a first output data appears in the output resister 226. After this, the output register 226 is updated with new output data after every 3 cycles. Thus, eight output data in total appear in one output register 226. The processor core 120 of the processor 100 reads data from the output register 226 in a software manner and transfers the data to the on-chip memory of the processor 100. One cycle is long enough for the processor 100 to read/write the on-chip register or memory. In other words, it takes 2 cycles for the processor 100 to read the output register 226 and to write it in the on-chip memory. If the throughput of the accelerator 200 takes 2 or more cycles, therefore, the operation results can be transferred without fail to the memory. Since the throughput of the accelerator 200 of FIG. 18 is 3 cycles, the condition is satisfied to eliminate the failure in fetching the operation results. By employing this construction, the processing of the accelerator 200 and the data transfer by the processor core 120 can be made in parallel temporally, improving the entire data processing performance of the processor 100.

As can be understood from the description thus far made, the accelerator 200 operates in a free-running manner in synchronism with the clock signal. When one data is written in the input register 222 by the access of the processor core 120, the operation results are sequentially fed to the output register 226 for a predetermined cycle period by the aforementioned free-running operation. Meanwhile, the processor core 120 has to be synchronized with the timing, at which new operation results sequentially appear in the output register 226, to store the operation results in the memory.

At this time, in the processor 100, when an interrupt request having a higher priority than that of the processing using the accelerator 200 occurs and the processor core 120 branches to the processing in response to the interrupt request of the higher priority, the output register 226 of the accelerator 200 is not overwritten with the next operation results, causing no failure in fetching the operation results. That is, when the interrupt request of the high priority occurs and the processor core 120 cannot read the output register 226 of the accelerator 200, the data from the operation of the accelerator 200 are temporarily stopped. This prevents the failure in fetching the operation results of the processor core 120. While the processor core 120 is performing the high priority processing, the operation of the accelerator 200 is temporarily stopped. After the processor core 120 ends the operation of the high priority, the operation of the accelerator 200 may be resumed. Since the operation of the accelerator 200 is stopped, the feed of the clock signals CLK1 and CLK2 are temporarily stopped.

Before a specific arrangement of the clock control circuit of the accelerator 200 is described, the fundamental arrangement of the clock feed stop control of the peripheral circuit will be described first with reference to FIGS. 21(A) and 21(B).

Figure 21A:
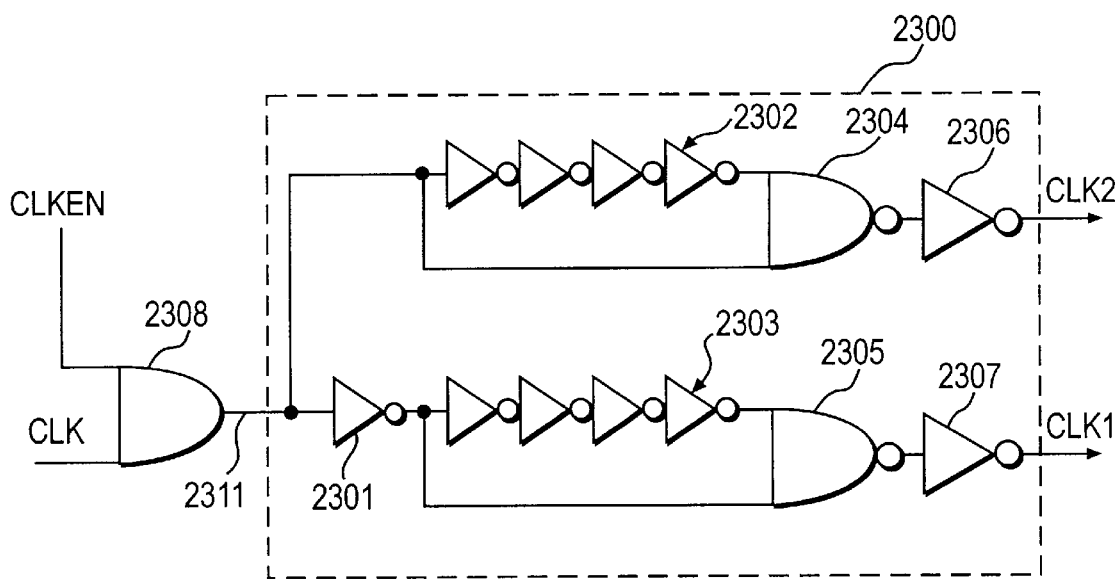
FIG. 21(A) is a diagram of a two-phase clock generator and FIG. 21(B) shows the operation timing thereof.
Figure 21B:
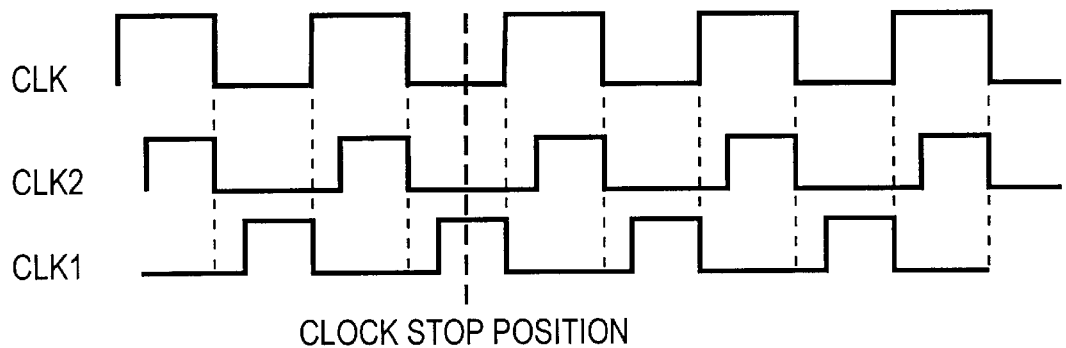

For the synchronizing clock signals in the processor, two-phase clock signals (non-overlapping two-phase clock signals) CLK1 and CLK2 having no overlap are used, as shown in FIG. 21(B). Specifically, the two clock signals CLK1 and CLK2 to be used have clock waveforms such that the period for which the amplitude is at the high level is shorter than the period for which the amplitude is at the low level, and have phases shifted by 180 degrees.

There may be a method of generating the two-phase clock signals CLK1 and CLK2 at one portion in the processor 100 and distributing them to the individual modules, but normally this method is not adopted. This is because the two clock signal lines are elongated if they are wired in the processor 100, so that the resultant propagation delay creates a time for which the high level periods of the two clock signals overlap with each other. Hence, there has been adopted a method of generating the two-phase clock signals CLK1 and CLK2 from one fundamental clock signal CLK in the individual modules by routing the fundamental clock signal CLK throughout the processor. In the case of the fundamental clock, the time for which the amplitude takes to reach the high level is equal to that for which the amplitude takes to reach the low level. FIG. 21(A) shows the detail of the two-phase clock generator to be used in each of the modules.

A two-phase clock generator 2300 is shown in FIG. 21(A) and includes an inverter 2301, two delay circuits 2302 and 2303, two NAND circuits 2304 and 2305 and two inverters 2306 and 2307. When a fundamental clock CLK is input to the input 2311 of the two-phase clock generator 2300, there appears in the clock signal CLK2 the waveform which is formed by the logical product between the fundamental clock waveform and the fundamental clock waveform delayed by the delay circuit 2302. In other words, as the clock signal CLK2, there is generated a clock waveform which has the same period as that of the fundamental clock signal CLK and in which the period for which the amplitude is at the high level is shorter than that for which the amplitude is at the low level. In the clock signal CLK1, meanwhile, there appears the result which is obtained by performing a similar operation for the inversion of the fundamental clock signal CLK. The clock signal CLK1 has a clock waveform, in which the period for which the amplitude is at the high level is shorter than that at which the amplitude is at the low level, as in the clock signal CLK2, and has a phase shifted by 180 degrees from the clock signal CLK2. The relations of these waveforms are illustrated in the timing chart of FIG. 21(B).

In FIG. 21(A), there is also shown an AND circuit 2308 for controlling whether or not the fundamental clock signal CLK is to be fed to the two-phase clock generator 2300. When a clock enable signal CLKEN is at the high level, the fundamental clock signal CLK is fed to the input 2311 of the two-phase clock generator. When the clock enable signal CLKEN is at the low level, the input 2311 of the two-phase clock generator is fixed at the low level. That is, when the clock enable signal CLKEN goes to the low level, the clock signal CLK1 is fixed at the high level whereas the clock signal CLK2 is fixed at the low level. This state is shown by the "clock stop position" in the timing chart of FIG. 21(B).

Here will be described the registers in the processor core 120 and the accelerator 200 to be operated with the aforementioned non-overlapped two-phase clock signals CLK1 and CLK2.

Figure 22A:
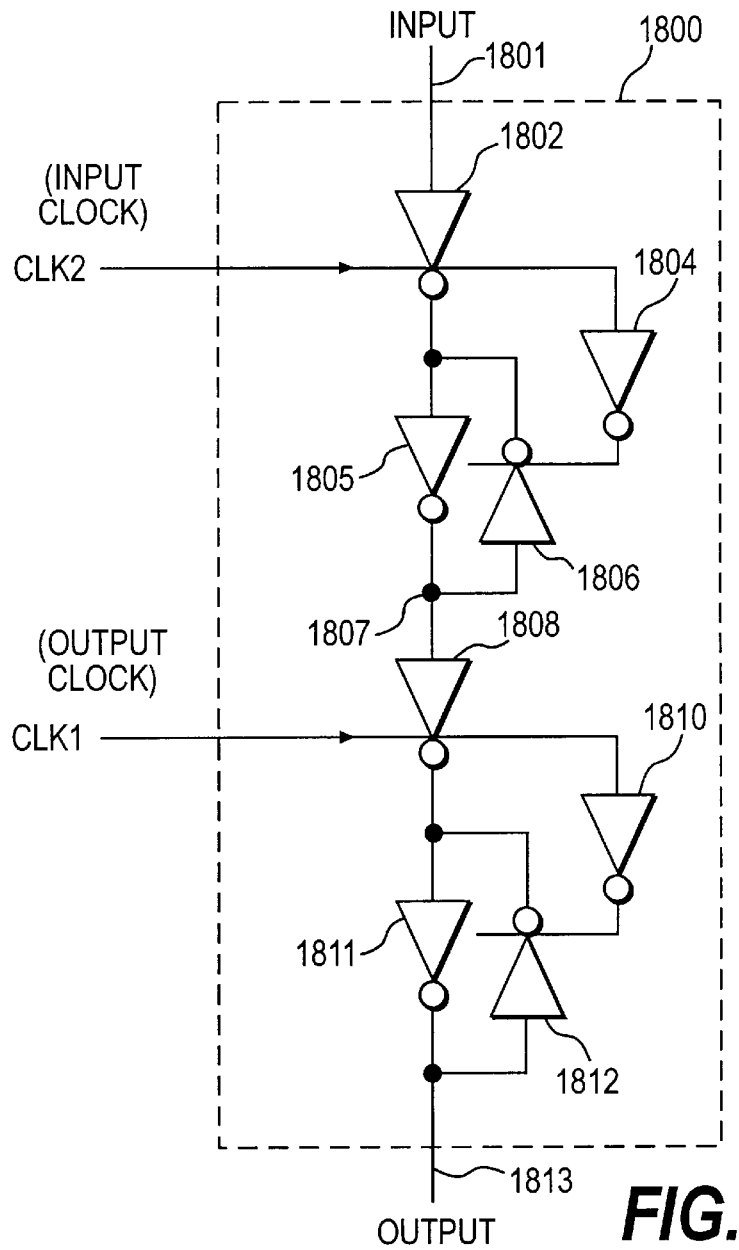
FIG. 22(A) is a logic circuit diagram showing the construction of 1 bit of a register of the master/slave type activated with a non-overlapping two-phase clock signal and FIG. 22(B) is a timing chart showing the clock signals CLK1 and CLK 2.

FIG. 22(A) shows the construction of 1 bit of a register representatively. Each bit of registers 222, 224 and 226 belonging to the accelerator 200, as has been described with reference to FIG. 18, is given the same structure as that of FIG. 22(A).

The 1 bit 1800 of the register is so constructed as to include four clocked inverters 1802, 1806, 1808 and 1812 and four inverters 1804, 1805, 1810 and 1811. The two clocked inverters 1802 and 1806 and the two inverters 1804 and 1805 constitute an input latch. This input latch opens the clocked inverter 1802 when the clock signal CLK2 is at the high level, to feed input data 1801 to a storage node 1807. When the clock signal CLK2 is at the low level, the clocked inverter 1806 is opened to latch data by looping back the contents of the storage node 1807. Meanwhile, the two clocked inverters 1808 and 1812 and the two inverters 1810 and 1811 constitute an output latch. This output latch opens the clocked inverter 1808 when the clock signal CLK1 is at the high level, to output the data latched by the storage node 1807 to an output terminal 1813. When the clock signal CLK1 is at the low level, the clocked inverter 1812 is opened to latch the preceding output data by looping back them.

Figure 22B:
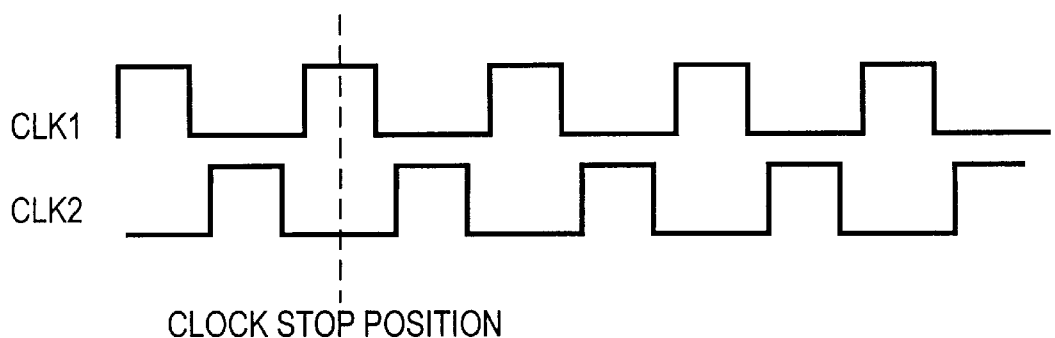

With this arrangement, with reference to FIG. 22(B), the register latches its stored information when the clock signal CLK1 is raised to the high level whereas the clock signal CLK2 is lowered to the low level. When the clock enable signal CLKEN is lowered to the low level, as has been described with reference to FIG. 21(B), the clock signal CLK1 is fixed at the high level whereas the clock signal CLK2 is fixed at the low level. Hence, it will be understood that the contents of the register are latched as they are when the clock enable signal CLKEN is forced to the low level to stop the feed of the clock signal to the peripheral circuit.

Figure 23:
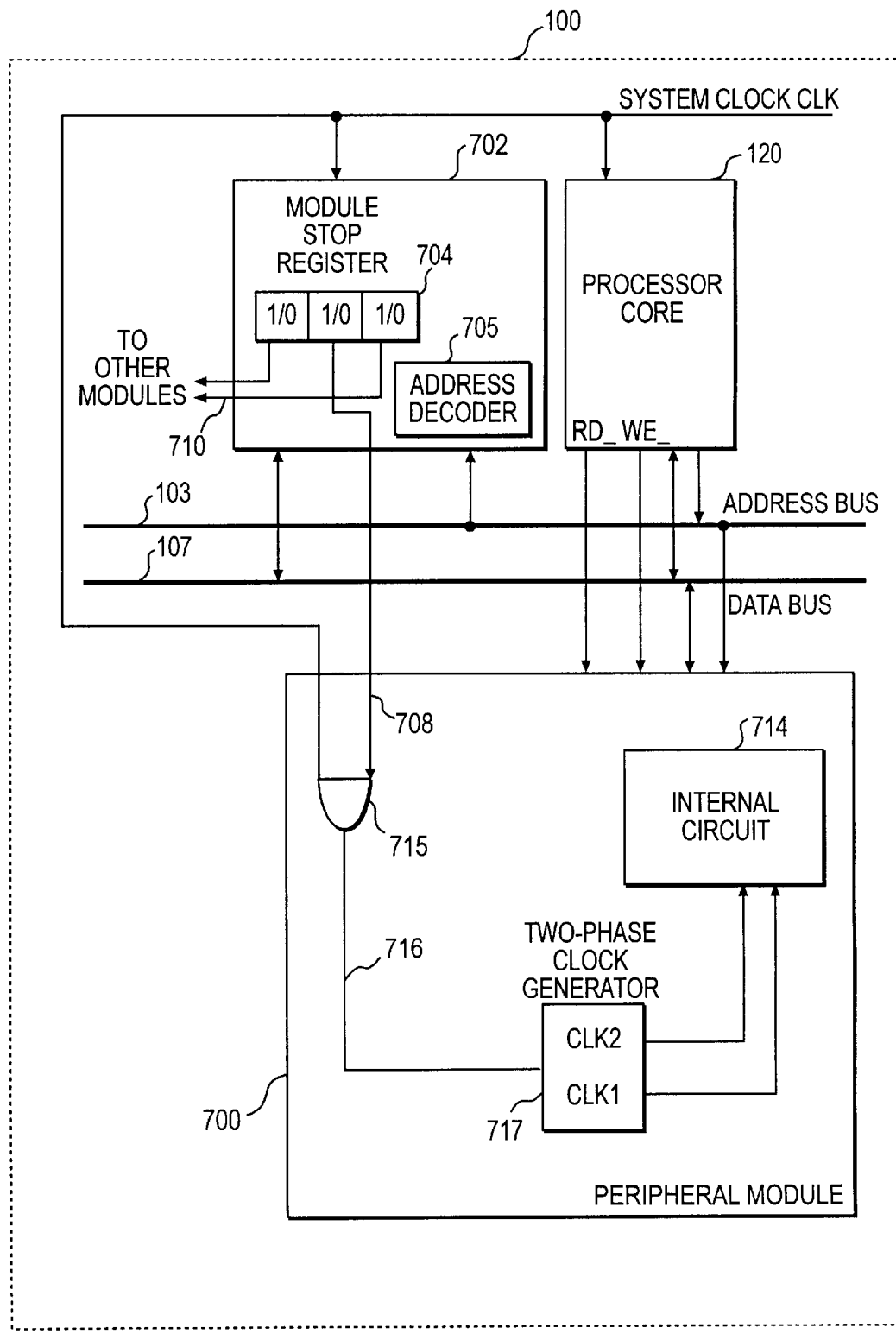
FIG. 23 is a block diagram showing a construction for controlling the clock feed to a peripheral circuit other than the accelerator in the processor of FIG. 17.

FIG. 23 shows the fundamental arrangement of the processor core 120 which controls the feed of the clock signals to the peripheral circuit including the accelerator 200 provided in the processor 100. In FIG. 23, there are representatively shown the processor core 120, a stop control module 702 and a peripheral module 700 which are provided in the processor 100. The stop control module 702 and peripheral module 700 are circuit modules which are contained in the peripheral circuit 13 shown in FIG. 17. The other circuit modules of FIG. 17 are not shown in FIG. 23.

The stop control module 702 includes a module stop register 704 and an address decoder 705. The processor core 120 can read/write by designating the module stop register 704 with the address signal. The address decoder 705 decodes the address signal to generate the select signal of the module stop register 704.

The individual bits of the module stop register 704 correspond to a predetermined number of peripheral modules (included in the peripheral circuit 113) which are mounted on the same chip where the microprocessor 100 is mounted. When the processor core 120 writes a value "1" in a bit of the register, the clock signal CLK is fed to the peripheral module corresponding to the bit. When a value "0" is written, the feed of the clock signal CLK is stopped. In FIG. 23, the 1 bit of the module stop register 704 is fed as a clock enable signal 708 to the peripheral module 700.

This peripheral module 700 is so constructed as to include an internal circuit 714, a two-phase clock generator 717 and an AND circuit 715. The internal circuit 714 has a function corresponding to the peripheral module 700, although not especially detailed here. The details of the two-phase clock generator 717 and the AND circuit 715 are identical to those of the two-phase clock generator 2300 and the AND circuit 2308, as has been described with reference to FIG. 21(A). Numeral 716 designates a clock input to the two-phase clock generator 717.

When the clock enable signal 708 is set to the value "0" (the low level), the clock signals XCLK1 and XCLK2 output from the two-phase clock generator 717 are fixed at the high level and at the low level, respectively. As a result, when the internal circuit 714 is fed with the two-phase clock signals XCLK1 and XCLK2 thus fixed to the states, the value of the not-shown built-in register is held. This built-in register is allocated as the resource of the peripheral circuit to the memory space of the processor 100.

The construction of the clock feed control to the accelerator 200 is not identical to that of FIG. 23. If this construction of the clock feed control to the accelerator 200 is identical to that of FIG. 23, the following disadvantage arises. While the processor core 120 is performing a processing such as waveform equalization in association with the accelerator 200, when an interrupt having a higher priority that of the equalization is requested, the processor core 120 is then branched into the interrupt handling program, and the processor core 120 cannot make an access to the module stop register 704 any longer. Therefore the clock feed of the accelerator 200 cannot be stopped. If the operation of the accelerator 200 continues during the interrupt processing of the processor core 120, processor core 120 will fail to fetch the operation results.

Therefore, the processor 100 is so constructed as to enable the control of the clock to the accelerator 200 indirectly even when the processor core 120 is disabled to perform the clock control directly by an unexpected interruption of a high priority.

First, a fundamental construction of the clock control for the accelerator 200 will be described with reference to FIG. 1.

Figure 1:
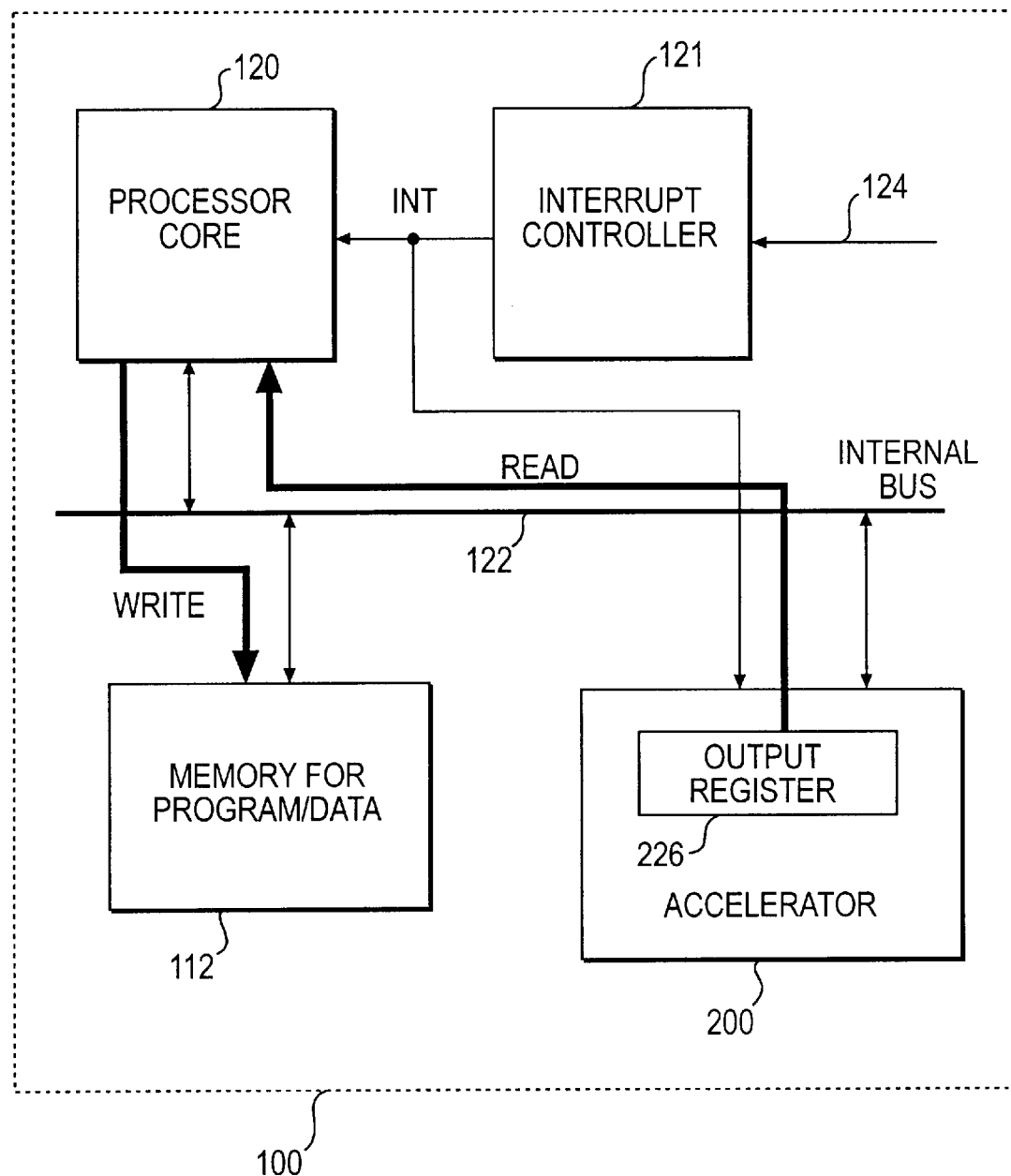
FIG. 1 is a block diagram showing one example of a processor which can stop the clock feed to an accelerator by the connection of the accelerator to the interrupt signal fed to the processor.

FIG. 1 shows an interrupt controller 121 and the accelerator 200 representatively as the aforementioned peripheral circuit 113 of the processor 100. The internal bus 122 is a generic name for the main address bus 103, the control bus 104 and the main data bus 107, as described with reference to FIG. 17, and it forms a connection between the processor core 120 and the accelerator 200, etc.

While the processor core 120 and the accelerator 200 are associated with each other to execute a processing such as waveform equalization, the processor core 120 has to read the output register 226 of the accelerator 200 continuously. Specifically, the processor core 120 reads the operation results appearing after every predetermined number of cycles in the output register 226, and writes the read data in the program/data memory 112. When an interrupt is requested for the processor core 120, and the processor core 120 is branched into the interrupt processing in response to the request, the processor core 120 cannot read the operation result data from the output register 226. For an interrupt of a low priority, the processor core 120 masks the interrupt request through the interrupt controller 121 immediately before it starts the processing using the accelerator 200, and thereby it can inhibit an interrupt by an interrupt request. After the end of the processing using the accelerator 200, the processor core 120 may cancel the inhibition of the interrupt of the low priority. However, the processing cannot be performed for an unmaskable interrupt of a high priority (e.g., an interrupt of a high priority such that high speed data input/output is required for occurrence of a specific event as data input for demodulation or for speech output).

When a request for an interrupt 124 that is of high priority occurs, the interrupt controller 121 feeds an interrupt signal INT that is output to the processor core 120, to the accelerator 200 so that the clock of the accelerator 200 can be controlled. As a result, even if the processor core 120 does not operate the bit, corresponding to the accelerator, of the module stop register 704, the feed of the clock signal to the accelerator 200 can be stopped. Numeral 124 designates an interrupt request signal.

Figure 2:
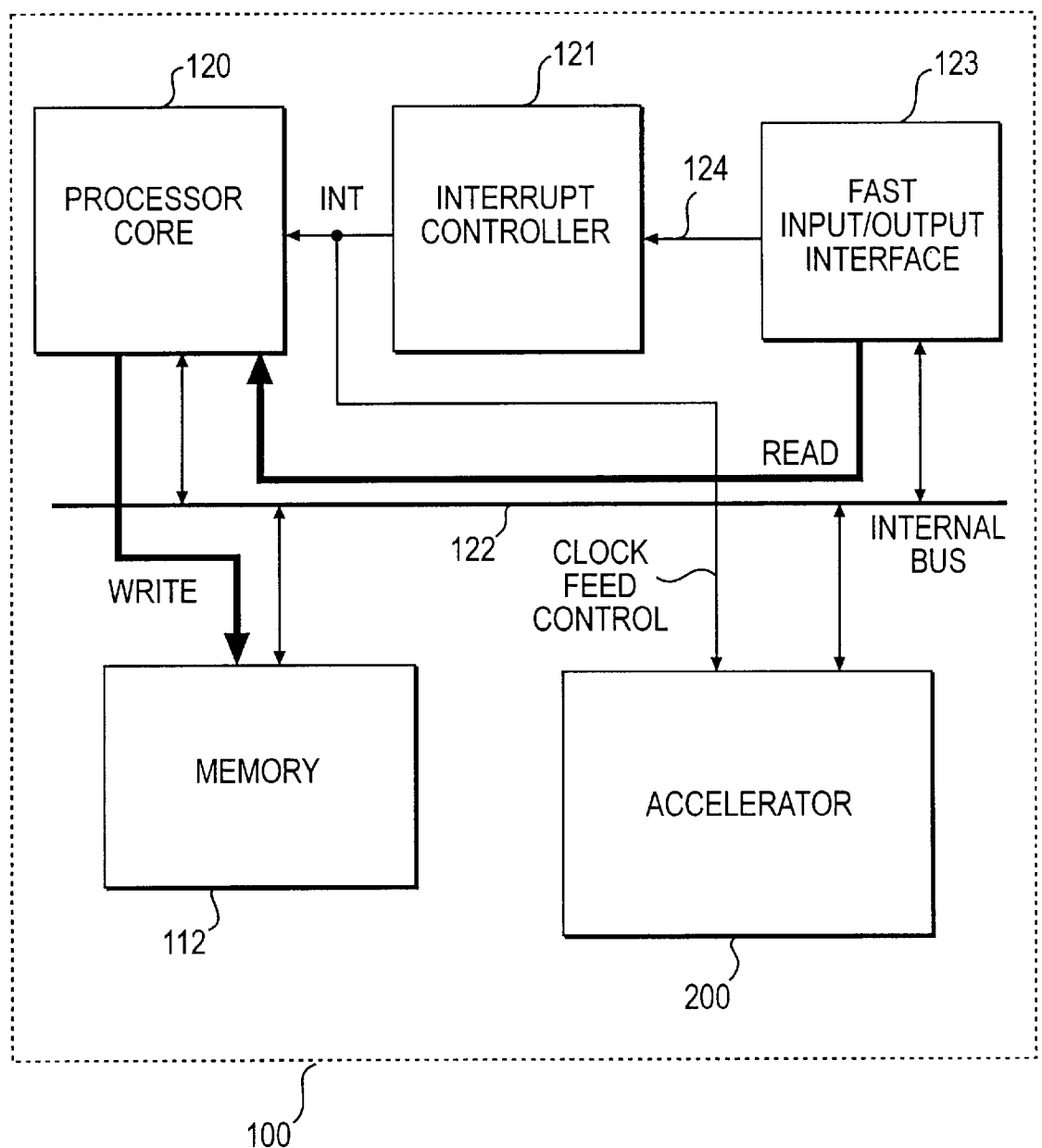
FIG. 2 is a block diagram showing another example of a processor which can stop a clock feed to an accelerator by the connection of the accelerator to the interrupt signal fed to the processor from a fast input/output interface.

FIG. 2 shows a construction in which a fast input/output interface 123 provided in the processor 100 feeds the interrupt request signal 124 to the interrupt controller 121. When the processor core 120 is branched to the interrupt processing by the interrupt request signal 124 of a high priority, the feed of the clock signal to the accelerator 200 is stopped in response to the interrupt signal INT, and the accelerator 200 interrupts the operation while holding the internal state of the operation at the time when the interrupt signal INT is activated. In response to the interrupt request, the operation of the processor core 120 is branched to the interrupt operation, in which it reads the data fed to the fast input/output interface 123, and writes the read data in the program/data memory 112. Even if the access (read, write) as shown in FIG. 1 cannot be performed, no failure of fetching the operation results by the accelerator 200 occurs.

Figure 3:
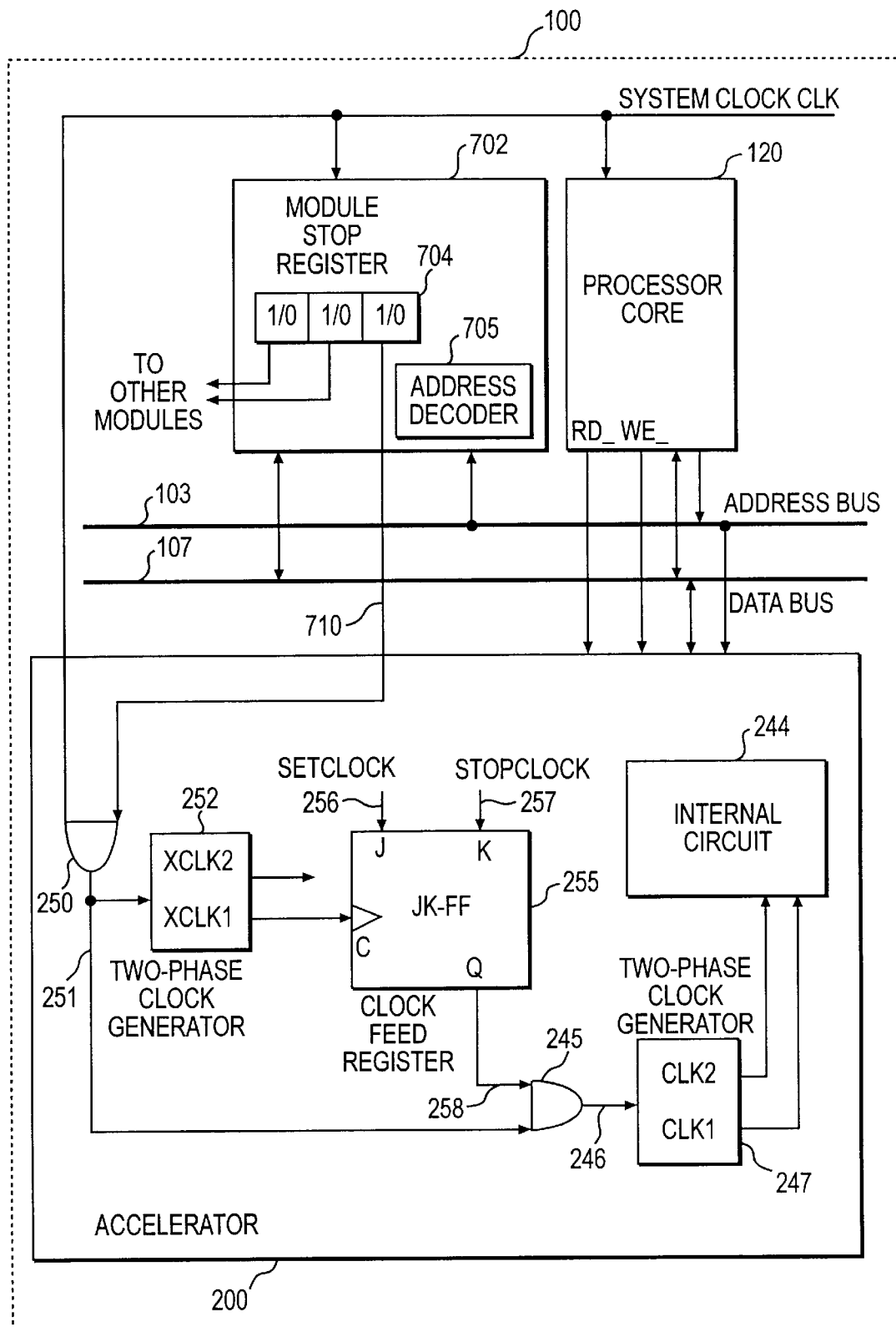
FIG. 3 is a block diagram showing one example of a processor and accelerator which can stop the feed of the clock signal to the accelerator in synchronism with the activation of the interrupt signal.

FIG. 3 shows an example of the construction, in detail, for stopping the feed of the clock signal to the accelerator 200 in synchronism with the activation of the interrupt signal.

In FIG. 3, the accelerator 200 includes an AND circuit 250, a two-phase clock generator 252, a 1 bit clock feed register 255, an AND circuit 245 and a two-phase clock generator 247 as the two-phase clock circuit 206 shown in FIG. 18. The AND circuit 250 and the two-phase clock generator 252 are substantially identical to those which have been described with reference to FIG. 21(A). An internal circuit 244 includes circuits other than the two-phase clock control circuit 206 of FIG. 18.

The clock feed register 255 is so constructed as to include one JK flip-flop, for example. The clock feed register 255 will also be referred to as a JK flip-flop 255. For the JK flip-flop 255, when the clock input C is at the high level, the output Q is set to 1 for J=1 and K=0 and set to 0 for J=0 and K=1. The output Q of this JK flip-flop 255 is the clock enable signal for the two-phase clock generator 247 to control the clock feed to the internal circuit 244. The clock feed register 255 itself needs to be set for resuming the clock feed even while the clock signals CLK1 and CLK2 to the internal circuit 244 are stopped. Therefore, the clock feed to the clock feed register 255 is effected by another two-phase clock generator 252. The enable control of this second two-phase clock generator 252 is performed by using the stop control module 702, as already described with reference to FIG. 23.

Figure 4:
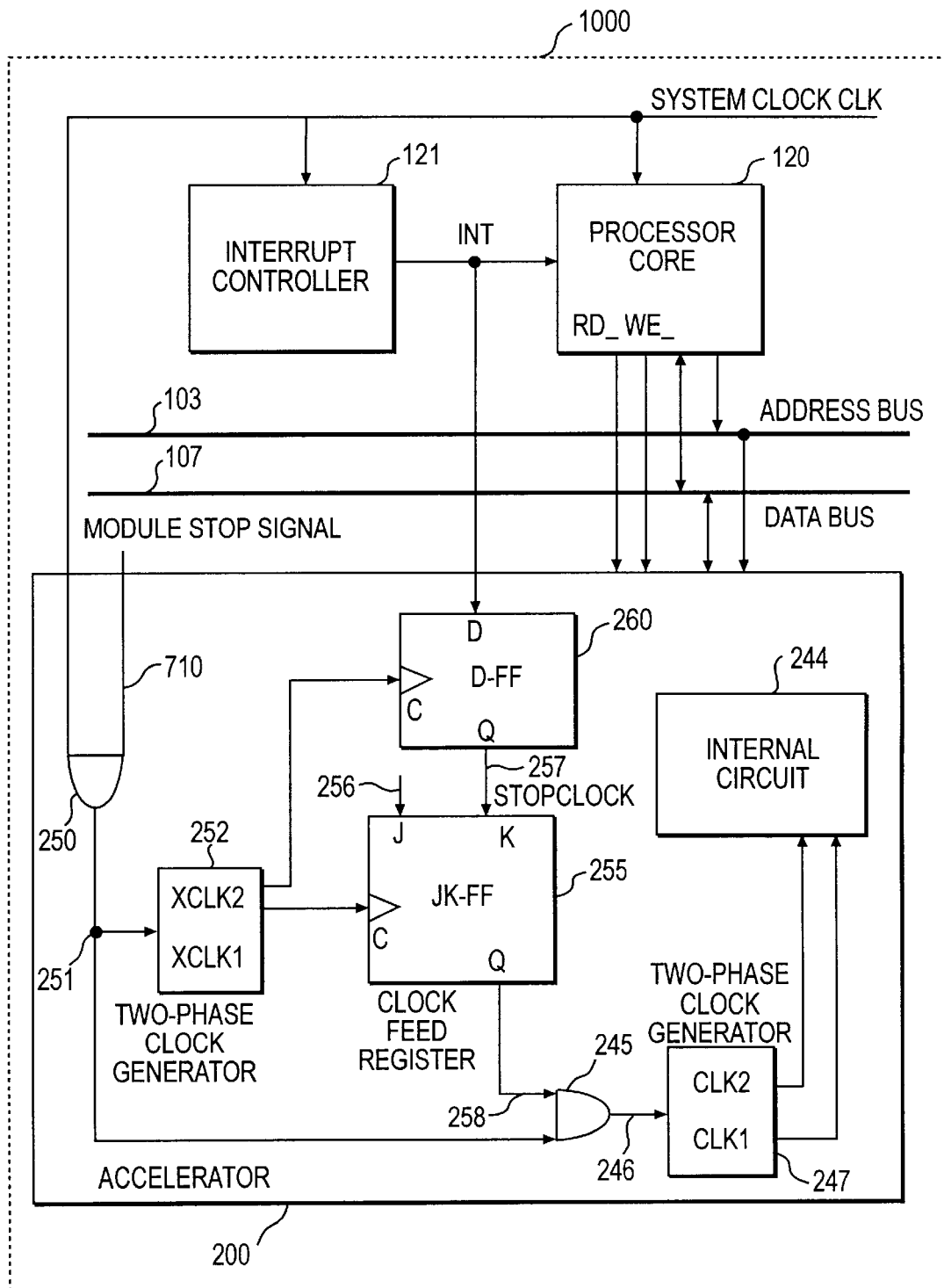
FIG. 4 is a block diagram showing a more specific example of a processor and an accelerator in which a clock feed register is reset by using the connection of the accelerator to the interrupt signal fed to the processor core.

The module feed register 255 can be reset, as representatively shown in FIG. 4, by using the interrupt signal INT to the processor core 120. In other words, a D flip-flop 260 is provided and fed at its data input terminal D with the signal INT and at its clock input terminal C with the clock signal XCLK2. The output terminal Q of this D flip-flop 260 is coupled to the input terminal K of the JK flip-flop 255.

The D flip-flop 260 outputs the value of the input terminal D (the value of the interrupt signal INT) to the output terminal Q when its clock input terminal C is at the high level. First, the interrupt signal INT from the interrupt controller 121 is latched by the D Flip-Flop 260 in synchronism with the clock signal XCLK2, and inputted to the input terminal K of the clock feed register 255. If J=K=0 is initially set by utilizing a not-shown control register, the output Q of the module feed register 255 can be reset (to the low level), by the construction, in synchronism with the change (activation) of the interrupt signal INT to the processor core 120 to the high level.

Here will be described a construction for activating the accelerator 200 in association with either the write operation of the input register 222 of the accelerator 200 or the read operation of the output register 226. Specifically, here is shown an example of the circuit for generating a signal 256 fed to the input terminal J of the JK flip-flop 255 of FIG. 4.

Figure 5:
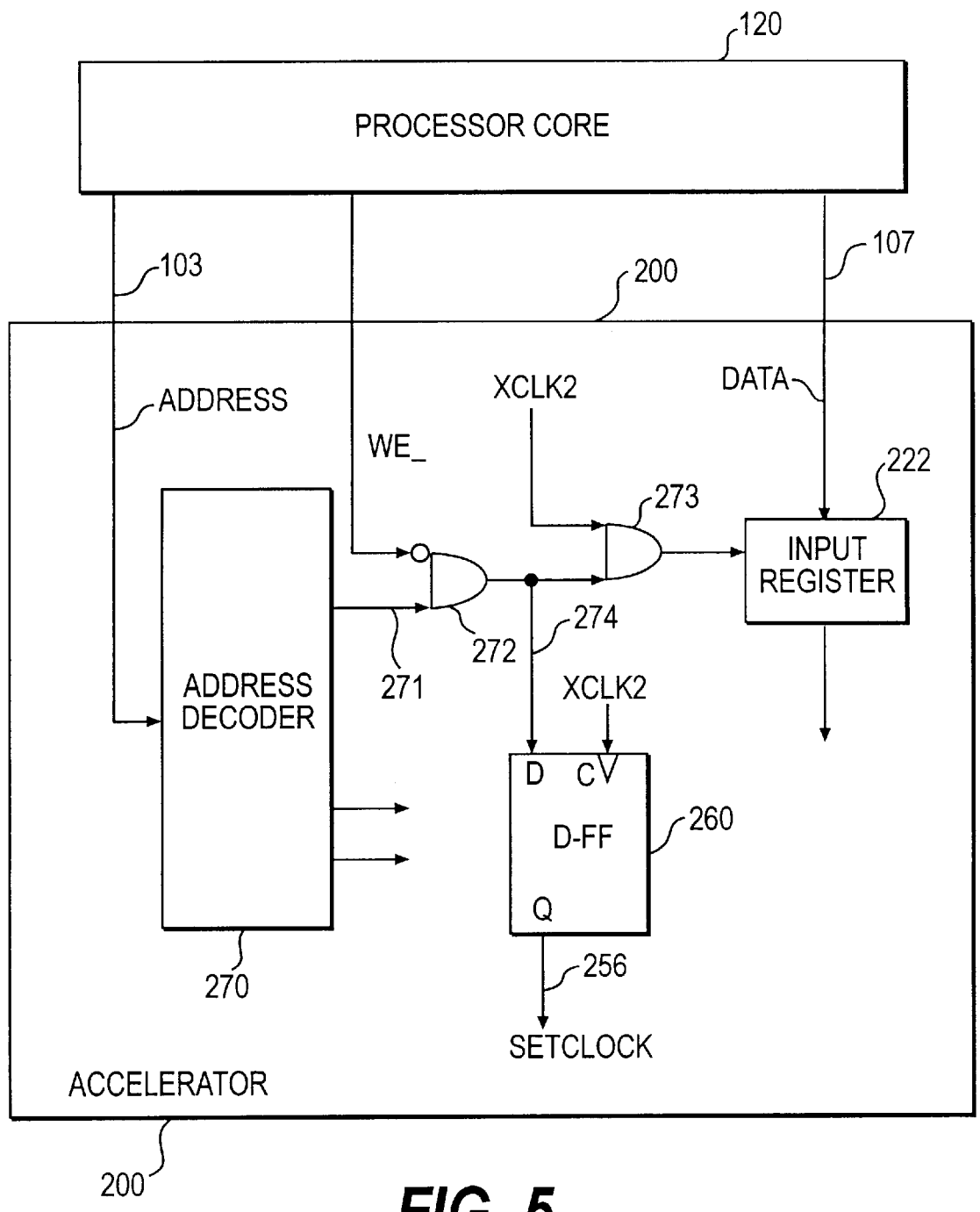
FIG. 5 is a block diagram of an accelerator in which an operating clock is fed to the accelerator in association with the writing of data to an input register of the accelerator.
Figure 6:
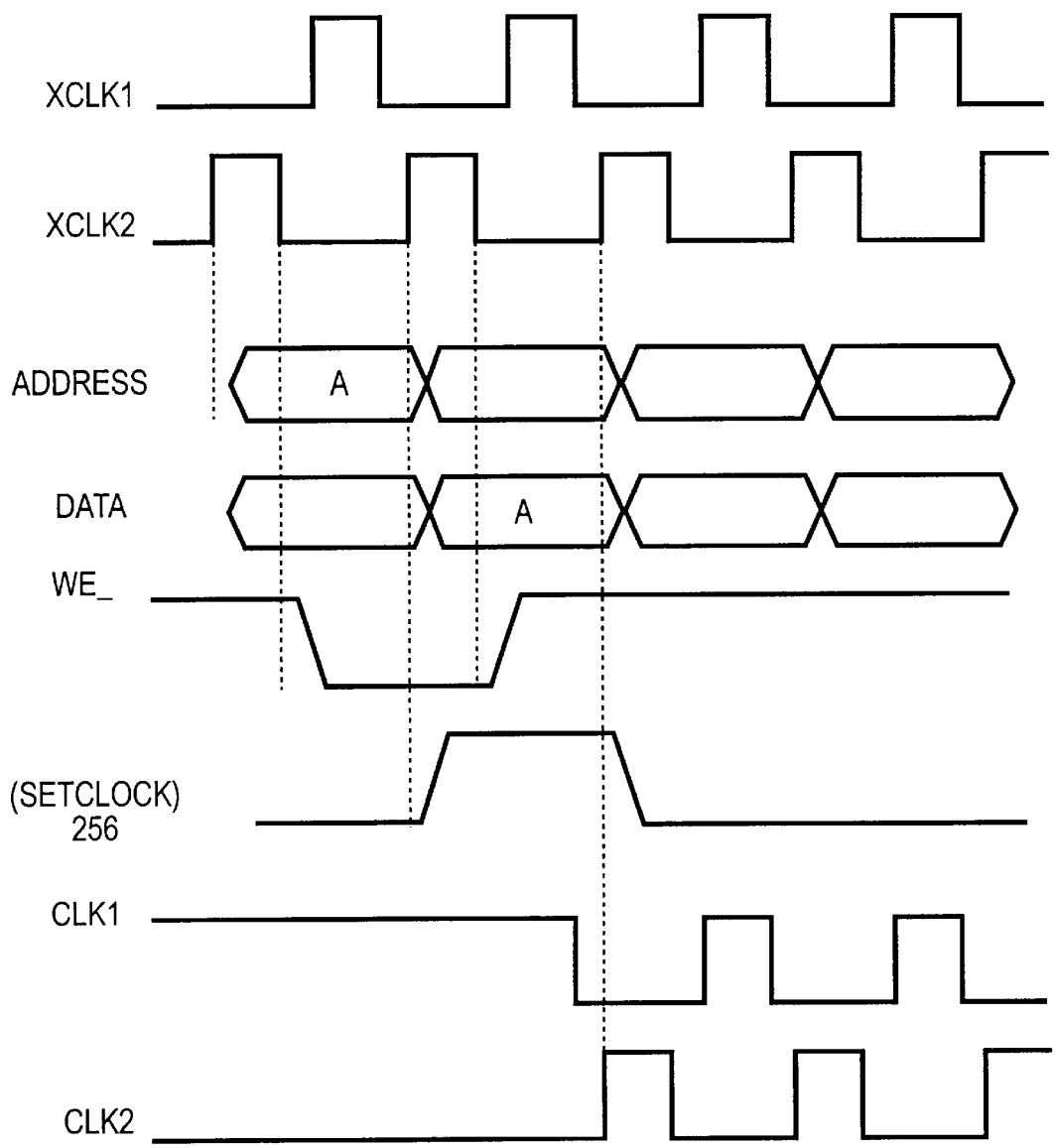
FIG. 6 is a timing chart illustrating one example of the operation timing of the operation of the embodiment shown in FIG. 5.

In the construction of FIG. 5, the operating clock is fed to the accelerator 200 in association with the write operation of the input register 222 of the accelerator 200. FIG. 5 shows the processor core 120 and the accelerator 200 representatively. In the inside of the accelerator 200, there is shown the portions necessary for the description, and the internal circuit 244 is not shown. There are shown an address decoder 270, two AND circuits 272 and 273, the D flip-flop 260 and the input register 222. When the processor core 120 issues the address of the input register 222 through the address bus 103, the address decoder 270 sets a select signal 271 of the input register 222 to the select level, i.e., the high level. If the write enable signal WE_ outputted from the processor core 120 is at the low level (assuming an active low), an output signal 274 of the AND gate 272 is set to the high level. This output signal 274 represents that the input register 222 is selected to be written. The input register 222 is written in synchronism with the clock signal XCLK2 while the select signal 274 is at the high level. This select signal 274 is further fed to the data input terminal D of the D Flip-Flop 260. The select signal 274 is outputted from the data output terminal D in synchronism with the clock signal XCLK2 fed to the clock input terminal C of the D flip-flop 260, and inputted as a set clock signal 256 of the clock feed register 255 of FIG. 3 to the input terminal J. With this construction, the module feed register 255 can be set (J=1) at the time of writing the input register 222. FIG. 6 illustrates the timing chart of the operation thus far described. Since the construction for setting the module feed register 255 of FIG. 5 is added to the construction of FIG. 4, the accelerator 200 can be started by writing the first data in the input register 222. When the accelerator 200 is stopped because of the interrupt of a high priority, moreover, the accelerator 200 can be restarted by writing the data once more in the input register 222 at the last of this interrupt routine.

Figure 7:
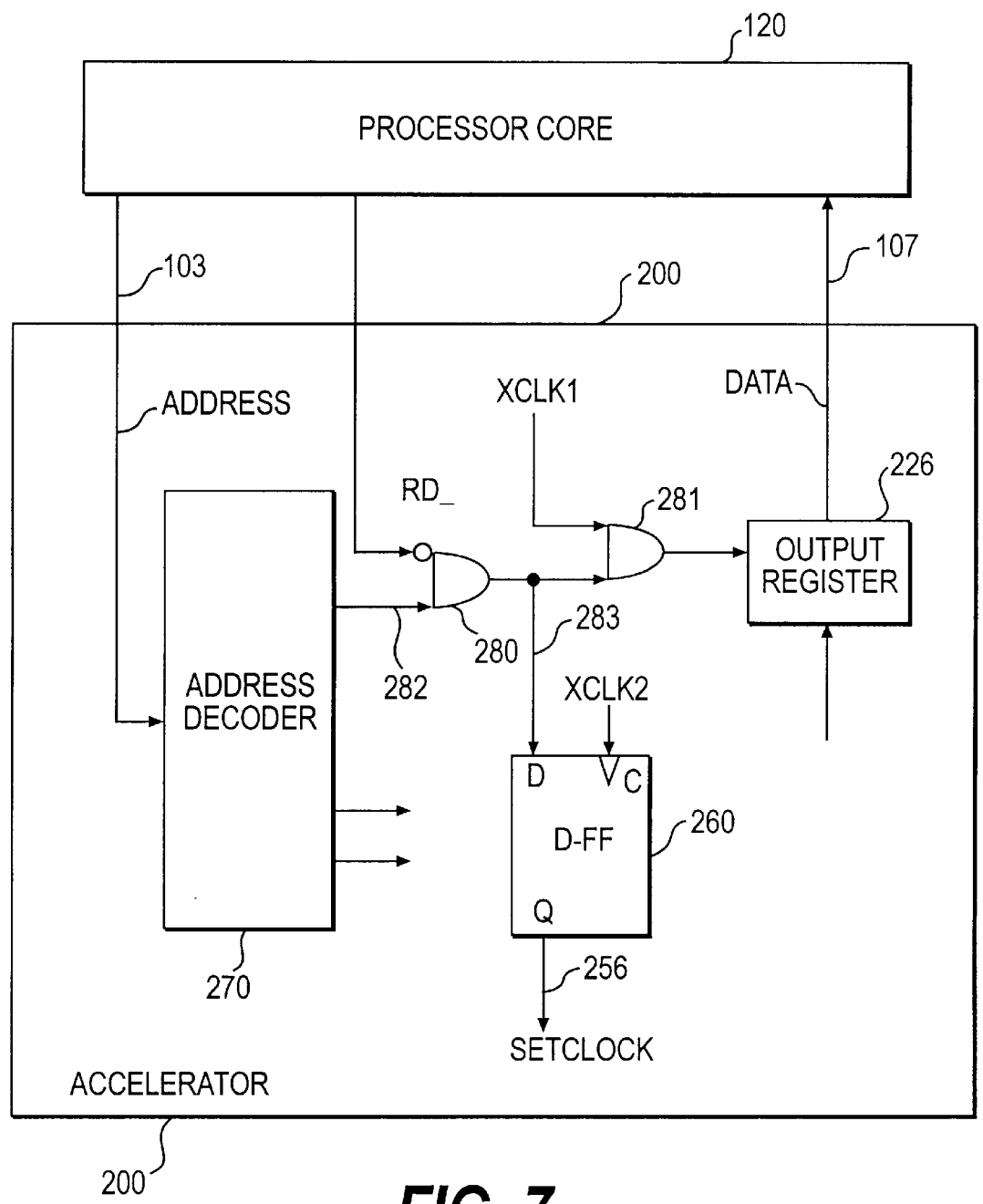
FIG. 7 is a block diagram showing an accelerator in which an operating clock is fed to the accelerator in association with the reading of an output register of the accelerator.

In the construction of FIG. 7, the operating clock is fed to the accelerator 200 in association with the reading of the output register 226 of the accelerator 200. In FIG. 7, the processor core 120 and the accelerator 200 are representatively shown. In the inside of the accelerator 200, there are shown only the portions necessary for the description, and the internal circuit 244 or the like is not shown.

There are shown the address decoder 270, two AND circuits 280 and 281, the D flip-flop 260 and the output register 226. When the processor core 120 issues the address of the output register 226 through the address bus 103, the address decoder 270 sets a select signal 282 of the output register 226 to the high level. If the read signal RD_ from the processor core 120 is at the low level (assuming an active low), a signal 283 is set to the high level. This signal 283 represents that the output register 226 is selected to be read. The output register 226 is read in synchronism with the clock signal XCLK1 while the select signal 283 is at the high level. This select signal 283 is further synchronized with the clock signal XCLK2 by the D flip-flop 260 and inputted as the set signal 256 of the clock feed register 255 to the input terminal J of the clock feed register 255.

Figure 8:
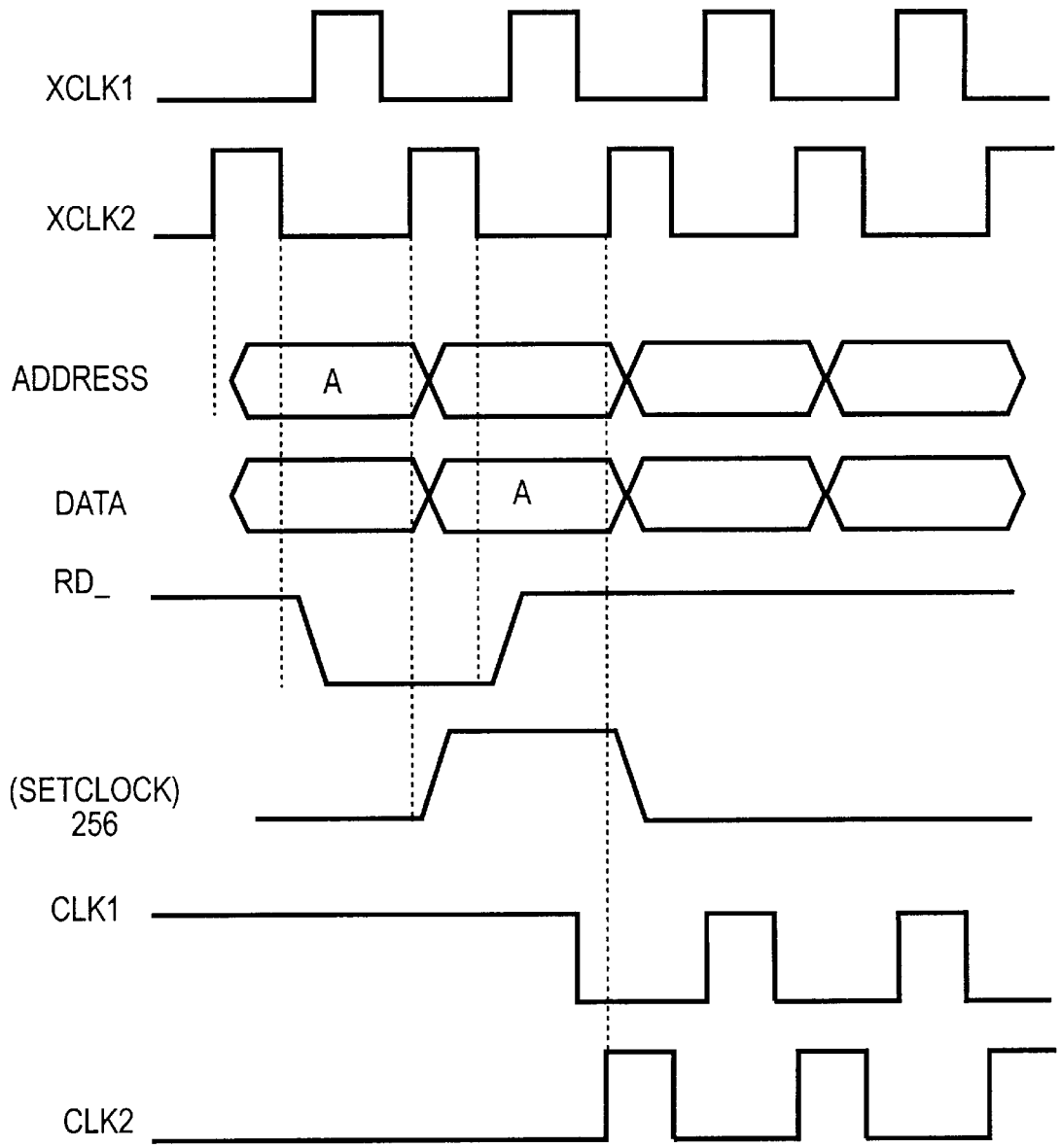
FIG. 8 is a timing chart illustrating one example of the operation timing of the operation of the embodiment shown in of FIG. 7.

With this construction, the module feed register 255 can be set at the time of reading the output register 226. FIG. 8 illustrates the detail of the timing of this case. Since the construction for setting the module feed register 255 of FIG. 7 is added to the construction of FIG. 4, when the accelerator 200 is stopped by the interrupt of a high priority, the accelerator 200 can be restarted by reading the data in the output register 226 at the last of this interrupt routine.

As a result of the arrangement of FIG. 4, as apparent from the description thus far made, the clock feed to the accelerator 200 can be stopped by using the interrupt signal INT to the processor core 120. If the construction of FIG. 5 or FIG. 6 is adopted, the clock feed to the accelerator 200 can be resumed by making an access to the register 222 or 226 of the accelerator 200 after the end of the interrupt routine.

A second example of the clock control of the accelerator 200 will be described with reference to FIGS. 9 and 10. In the example to be disclosed, another bus master such as a DMAC 131 capable of interrupting data transfer of a high priority exists in addition to the processor core 120. If the processor core 120 does not respond to the interrupt request, the processor core 120 may lose the bus right and may fail to fetch the output of the accelerator 200. An example for preventing this failure will be described in the following.

Figure 9:
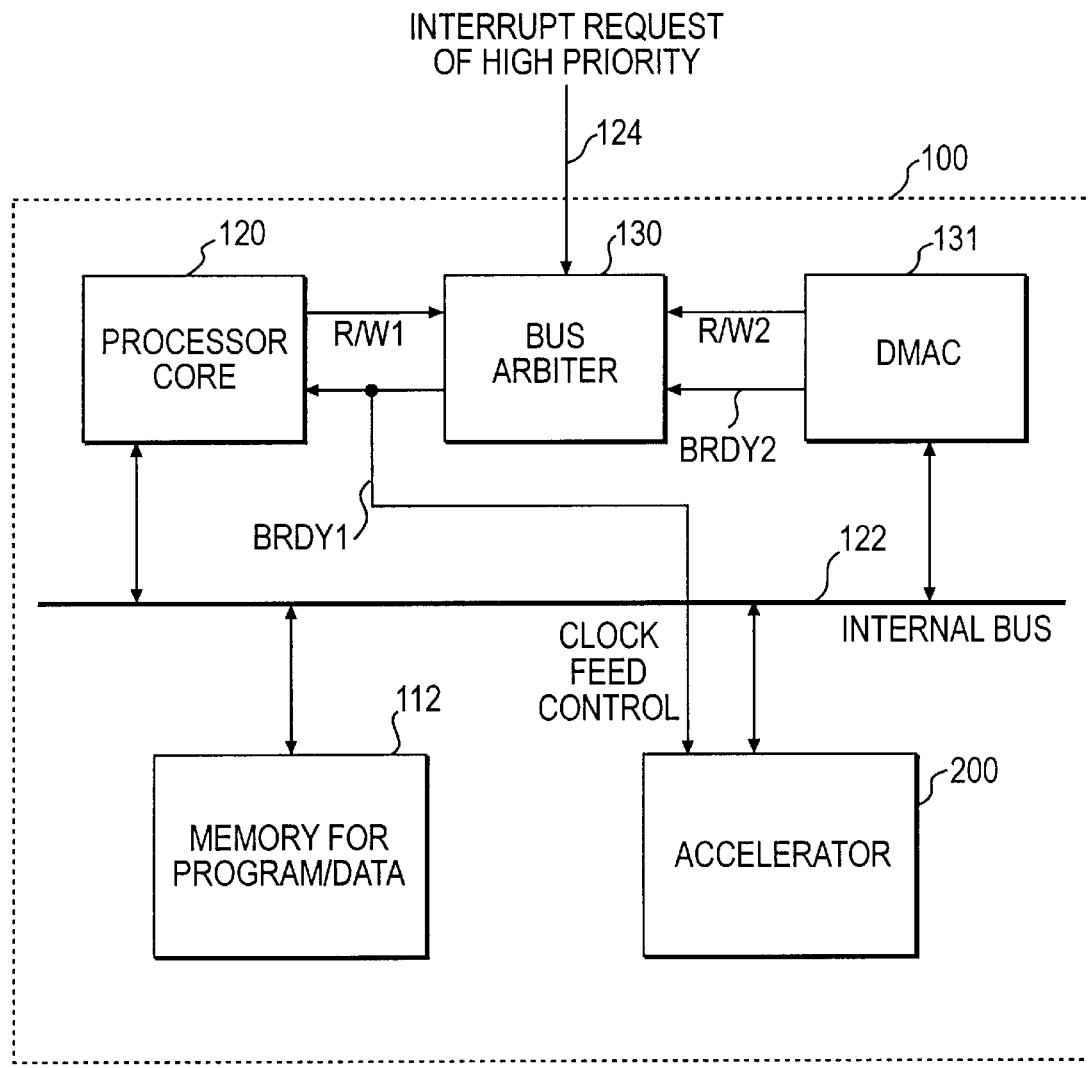
FIG. 9 is a block diagram showing a processor for making it possible to control the clock feed to an accelerator when another bus master, such as a DMAC for processing a data transfer interrupt of high priority, is incorporated in addition to the processor core.

In FIG. 9, the processor 100 further includes a bus arbiter 130 and a DMAC 131. The bus arbiter 130 and the DMAC 131 are circuit modules which are included in the peripheral circuit 113 of FIG. 17. The bus arbiter 130 receives: the interrupt request 124 of a high priority; a read/write signal R/W1 outputted from the processor core 120; and a read/write signal R/W2 outputted from the DMAC. The bus arbiter 130 enables either of the bus ready signals BRDY1 and BRDY2 depending upon which request has higher priority than the other. In the example of FIG. 9, the clock feed to the accelerator 200 is stopped by employing the bus ready signal BRDY1 to the processor core 120.

Figure 10:
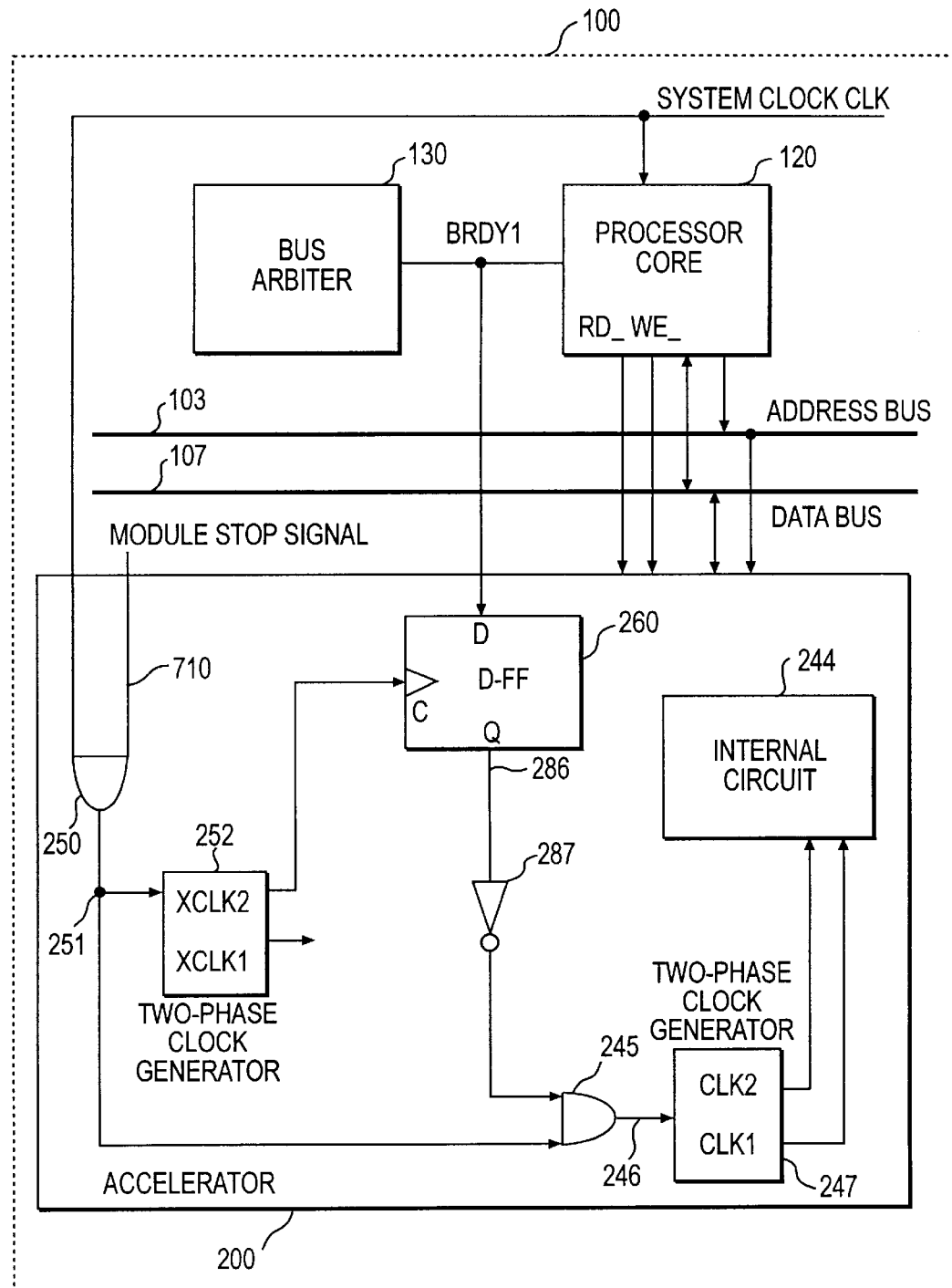
FIG. 10 is a block diagram showing one example of an accelerator in which the clock feed is stopped by using a bus ready signal sent to the processor core.

FIG. 10 shows an example of the accelerator 200 which is so constructed as to stop the clock feed to the accelerator 200 by employing the bus ready signal BRDY1 to the processor core 120. In FIG. 10, the accelerator 200 includes the internal circuit 244, the two-phase clock generators 252 and 247 and the AND circuits 250 and 246, and further the inverter 272 and the D flip-flop 270. A D flip-flop 285 latches and outputs the value of the bus ready signal BRDY1, fed to the input terminal D, to the output terminal Q when the clock signal XCLK2 fed to the clock input terminal C is at the high level. This output 286 of the D flip-flop is inverted by an inverter 287 into a clock enable signal for the two-phase clock generator 247. The bus ready signal BRDY1 is an active low signal. The D flip-flop 247 itself needs to be set so that it can resume the clock signal feed even while the feed of the clock signals CLK1 and CLK2 to the internal circuit 244 is stopped. Thus, the feed of the clock signal to the clock terminal C of the D flip-flop 285 is effected by another two-phase clock generator 252. The enabling control of the two-phase clock generator 251 is effected as in the description referring to FIG. 23 by employing a module stop signal 710.

As understood from the examples of FIGS. 9 and 10, the feed of the clock signal to the accelerator 200 can be stopped by employing the bus ready signal BRDY1 to the processor core 120. When this control is adopted, the feed of the clock signals CLK1 and CLK2 to the internal circuit 244 is automatically resumed at the instant when the processor core 120 restores the bus right (when the bus ready signal BRD1 is raised to the high level and the processor core again owns the bus).

Figure 11:
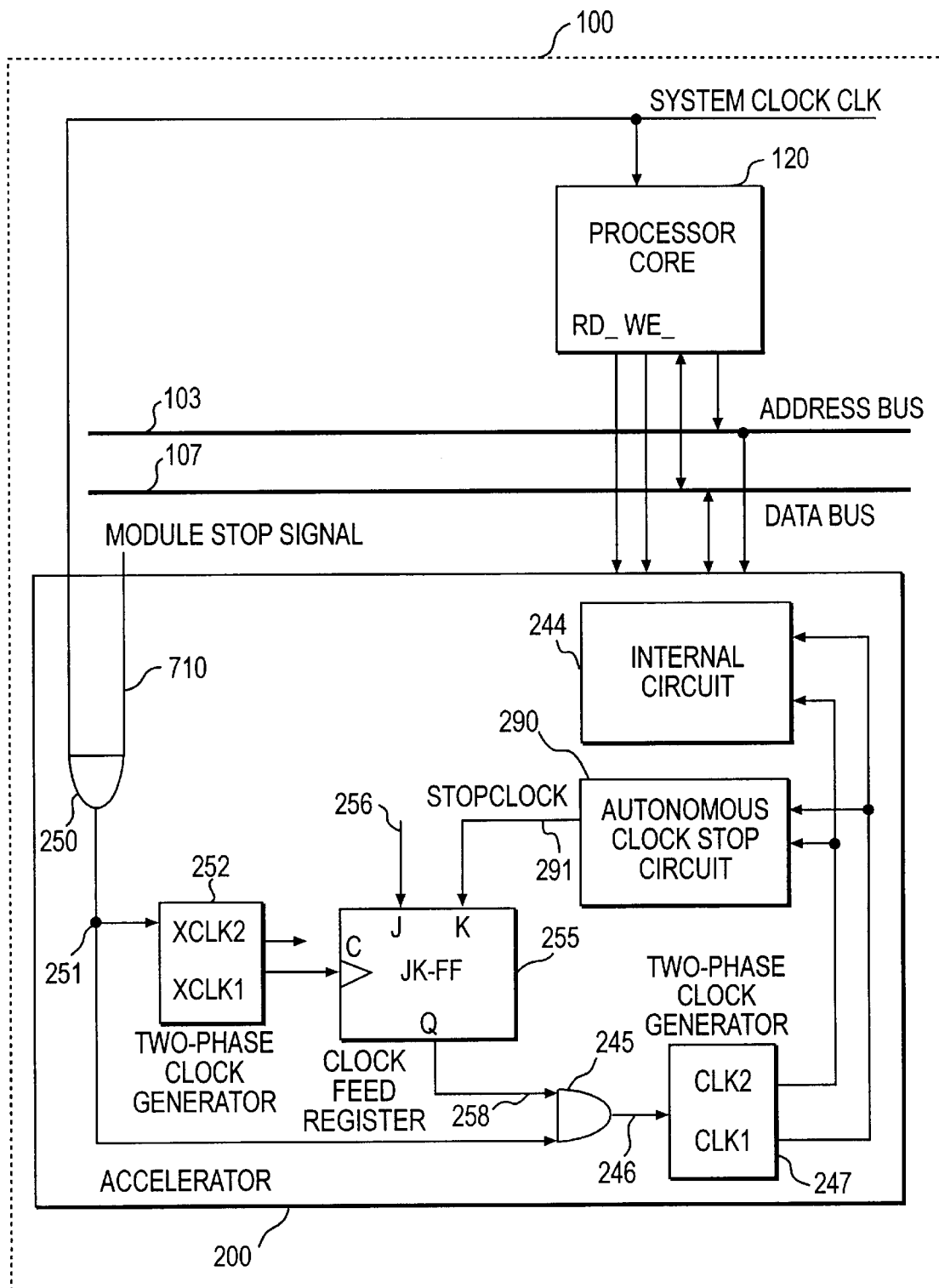
FIG. 11 is a block diagram showing one example of an accelerator in which an autonomous clock stop circuit is added to the arrangement of FIG. 3.

Here will be described a third example of the clock control of the accelerator 200. FIG. 11 shows a construction in which the feed of the clock signals CLK1 and CLK2 to the internal circuit 244 is stopped by autonomously clearing the 1-bit clock feed register 255 in the accelerator 200, as has been described with reference to FIGS. 3 and 4.

As shown in FIG. 11, an autonomous clock stop circuit 290 is added to the arrangement of FIG. 3. This autonomous clock stop circuit 290 generates a clock stop signal after the operation of a predetermined number of cycles from the start of the accelerator 200, and feeds it to the input terminal K of the JK flip-flop 255. When the clock stop signal 291 at the high level is fed to the input terminal K of the JK flip-flop 255, a clock enable signal 258 outputted from the output terminal Q of the JK flip-flop 255 is lowered to the low level to stop the generation of the clock signals CLK1 and CLK2 by the two-phase clock generator 247.

Figure 12:
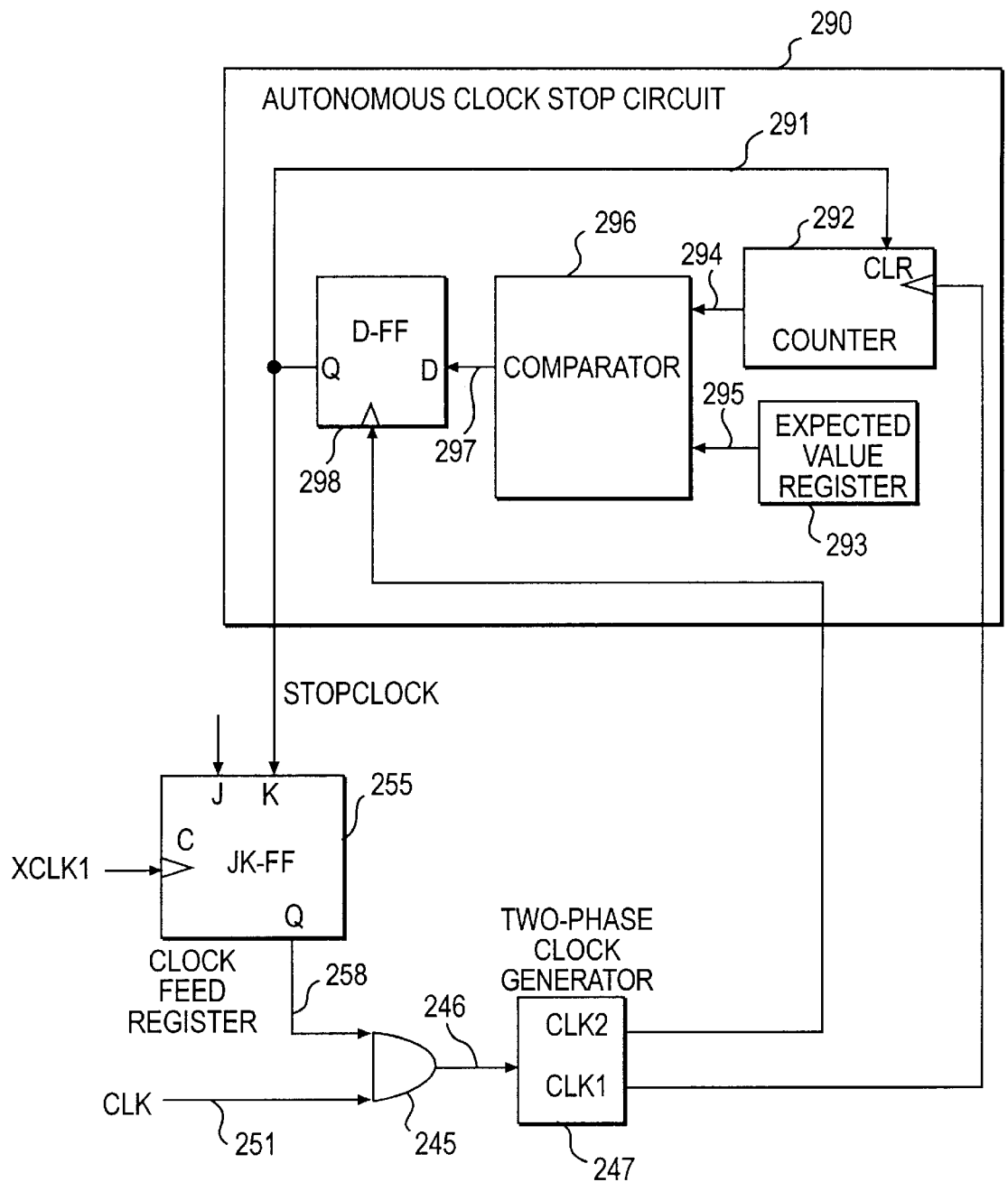
FIG. 12 is a block diagram showing one specific example of the autonomous clock stop circuit.
Figure 13:
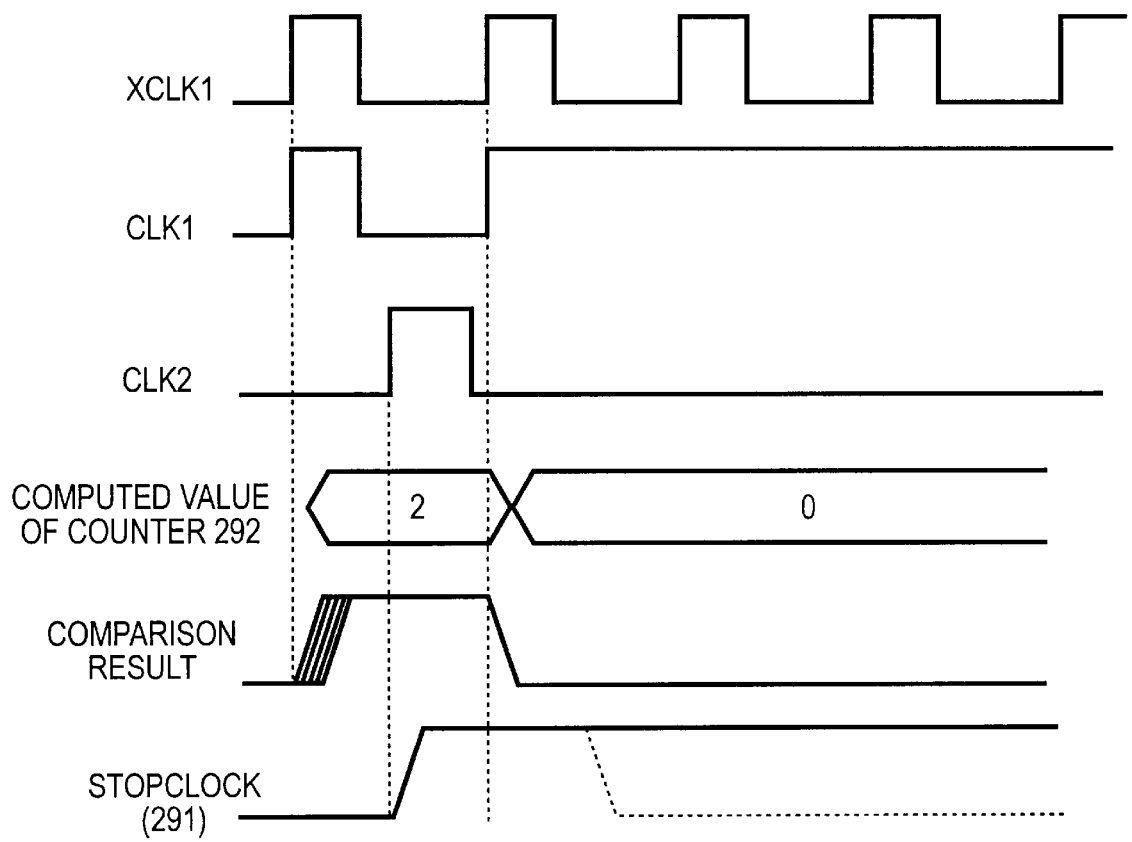
FIG. 13 is a timing chart illustrating the operation timing of the operation of the autonomous clock stop circuit.

FIG. 12 shows an example of the internal construction of the autonomous clock stop circuit 290. FIG. 13 illustrates an operation timing chart of the autonomous clock stop circuit 290. The autonomous clock stop circuit 290, as shown in FIG. 12, includes a counter 292, an expected value register 293, a comparator 296 and a D flip-flop 298. The counter 292 performs a count-up operation in synchronism with the clock cycle of the clock signal CLK1 which is fed to the clock input terminal. The counted value of the counter 292 is compared with the value of the expected value register 293 by the comparator 296. The accelerator 200 can gives the operation results to the output register 226 after every three cycles, as has been described with reference to FIGS. 18 and 20, the expected value to be set in the expected value register 293 is set to "2" in this example. In short, the counter 292 repeatedly the counted value "0" to "2". When the value of the counter 292 is counted up from "0" and becomes the expected value "2", a coincidence pulse 297 is outputted from the comparator 296. In response to this coincidence detection pulse 297, the counted value of the counter 292 is cleared to "0". Moreover, the coincidence detection pulse 297 is latched by the D flip-flop 298 in synchronism with the clock signal CLK2, and inputted to the input terminal K of the JK flip-flop 255. This stops the feed of the clock signals CLK1 and CLK2 to the autonomous clock stop circuit 290.

The means for resuming the feed of the clock signals CLK1 and CLK2 to the internal circuit 244 is not shown in FIG. 12. However, the feed of the clock signals CLK1 and CLK2 can be resumed in synchronism with the processor core accessing the accelerator for a variety of purposes, such as the reading of the output register 226 of the accelerator 200, for example, as has been described hereinbefore.

Figure 14:
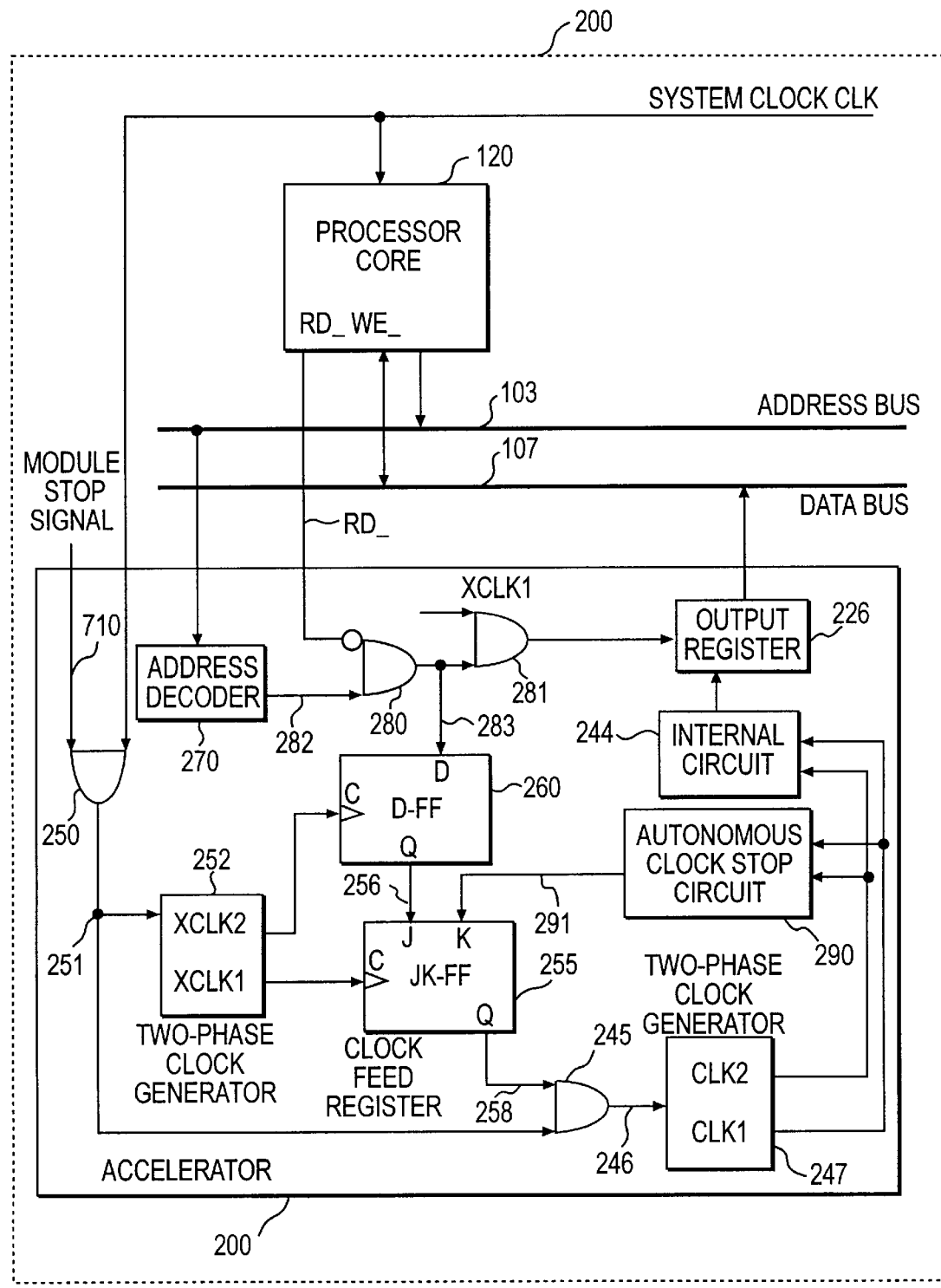
FIG. 14 is a block diagram showing the accelerators incorporating the embodiments set forth in FIGS. 7 and 11.

FIG. 14 shows a arrangement of the accelerator 200, in which the arrangements of FIG. 11 and FIG. 7 are combined. As a result of the arrangement of FIG. 14, the accelerator 200 never fails to be stopped after it has started operating for the cycles (e.g., 3 cycles) corresponding to the value which is set in the expected value register 293 of the autonomous clock stop circuit 290. The processor core 120 resumes the feed of the clocks CLK1 and CLK2 to the internal circuit 244 by reading the output register 226 of the accelerator 200. The processor core 120 can feed the clock signals CLK1 and CLK2 to the accelerator 200 by continuously reading a specific register of the accelerator 200, i.e., the output register 226 at the predetermined intervals (every three cycles). When the feed of the clock signals CLK1 and CLK2 is to be stopped, the processor core 120 must not read the output register 226. When the processor core 120 cannot read the output register 226 because of an interruption of a high priority, the accelerator 200 automatically stops.

Owing to the arrangement of FIG. 14, when the processor core 120 cannot read the output register 226 of the accelerator 200, the feed of the clock signals CLK1 and CLK2 to the internal circuit 244 can be automatically stopped. The clock feed of the clock signals CLK1 and CLK2 to the accelerator 200 can be resumed in response to the processor core 120 accessing the accelerator 200, which is an indication that the interrupt processing has been completed, such as by the processor core 120 reading the output register 226 of the accelerator 200.

In the case of the third example of the clock control, as having been described with reference to FIGS. 11 to 14, the accelerator voluntarily stops the clock signals for synchronizing the processings each time it ends the necessary processing to be performed, by itself. In the case of this third embodiment, therefore, the feed of the clocks is voluntarily stopped till something requiring the next operation, such as the aforementioned write in the input register or read of the output register or other access by the core processor 120, occurs, so that the effect to reduce the power consumption can be achieved.

Any suitable combination of the following first to third modes can be adopted: the first mode in which the internal clock signal is stopped in synchronism with the interrupt of the operation control means by the interrupt signal; the second mode in which the internal clock signal is stopped when the operation control means is instructed to abort the bus right by the bus arbitration means; and the third mode in which the internal clock signal is automatically stopped at each interval when the operation control means has to read the operation results from the special-purpose hardware means.

There has been described the case in which the invention made by the inventors is applied to a mobile communication terminal device such as a digital cellular portable telephone. However, the invention can also be applied to a data processor using an error correcting accelerator or an accelerator for a speech encoder/decoder. These devices are useful for receivers of a digital TV and audio broadcasting. The mobile communication terminal devices are not limited to the GSM.

The processor shown in FIG. 17 can be so constructed as to be extended to an ASIC so that it can match other applications easily.

Figure 24:
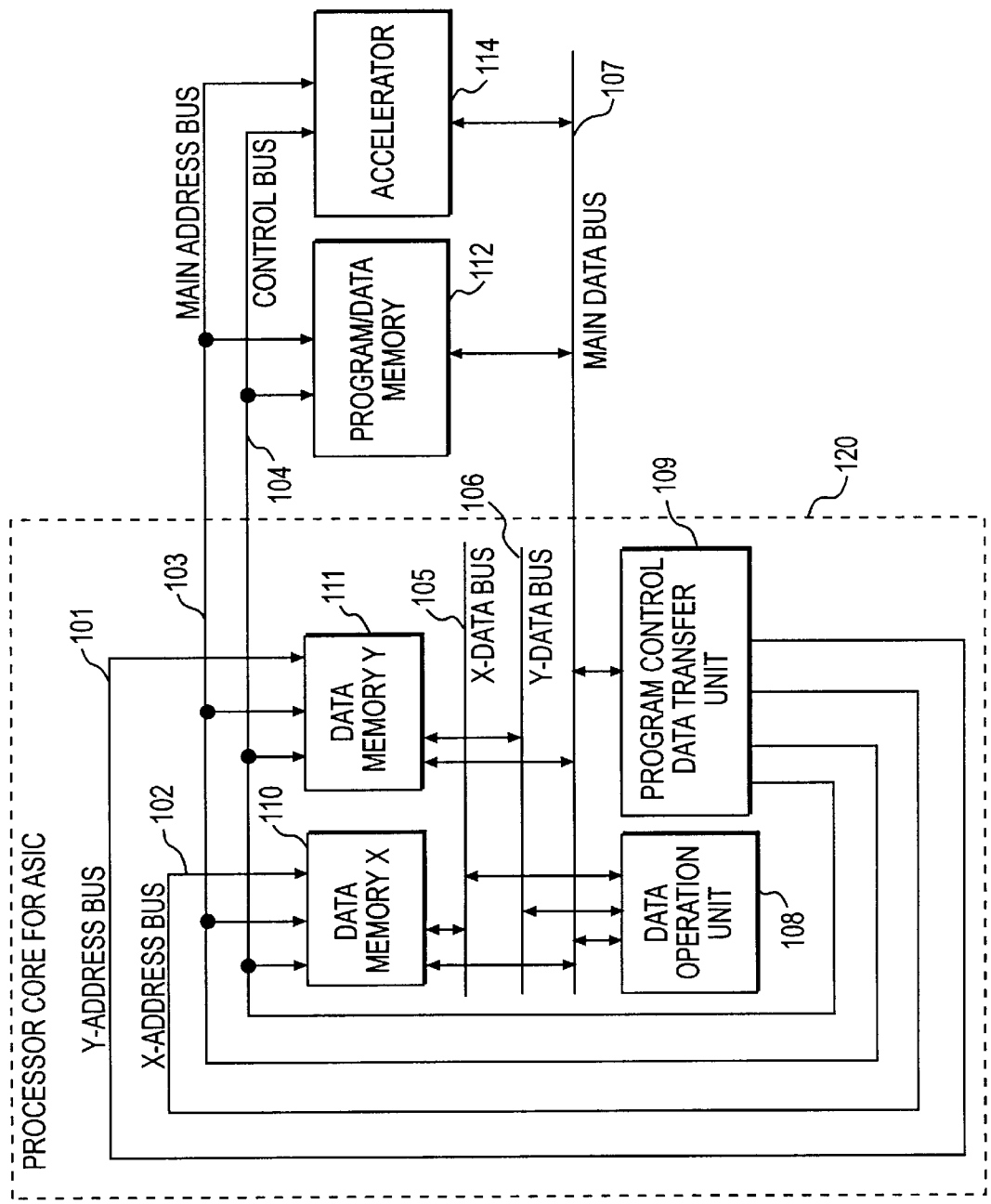
FIG. 24 is an overall block diagram of a processor in which the processor core of FIG. 17 and an accelerator for the individual use are mounted on a common chip, considering an ASIC development.

FIG. 24 is a block diagram showing a construction in which the processor such as the DSP or integrated processor shown in FIG. 17 is generalized for an ASIC. For example, the processor core 120 is constructed into one for the ASICs (Application Specific Integrated Circuits). That is, the processor is assembled into the ASIC processor core 120 such that it is stored in its library with the layout design data which are verified in the logic function and the device structure related to the processor core 120, and such that its portions other than the program/data memory 112 and an accelerator 114 can be commonly used for all the other applications. Inversely speaking, application to another field can be simplified by customizing the program/data memory 112 and the accelerator 114.

The flip-flop employed for the clock control of the accelerator should not be limited to a JK flip-flop but may alternatively be an RS flip-flop.

In the description thus far made, the accelerator is mounted on the chip where the processor core is mounted, but the accelerator and the processor core can be mounted on different chips. In this modification, the difficulty of the control due to the fact that the processor core and the accelerator are on different chips can be prevented when the clock control method shown in FIG. 14 is used.

The effects obtained by the representative embodiments of the invention disclosed herein will be briefly described in the following.

Even when the processor means of the data processing device is interrupted or loses the bus right and accordingly the processing is interrupted while it is operating in association with special-purpose hardware means such as an accelerator, it is possible to prevent the operation results of the special-purpose hardware means from failing to be fetched.

By applying such a data processing device to a data processing system such as a mobile communication terminal device, fast processing for coping with an increase in the quantity of processing can be promoted by using the accelerator means.

In the accelerator of the data processing device, moreover, the effect of reducing the power consumption can be achieved by adopting the construction in which the internal clock signal for synchronizing the operations at each end of the necessary operations to be performed by itself is voluntarily stopped. Such data processing device of this low power consumption type is suitably applied to a battery-driven system such as a mobile communication terminal device.

While preferred embodiments have been set forth with specific details, further embodiments, modifications and variations are contemplated according to the broader aspects of the present invention, all as determined by the spirit and scope of the following claims.

We claim:

1. A data processing device, comprising:
   a circuit unit having an output memory;
   a processor connected with said circuit unit for transferring data to said circuit unit and for accessing said output memory for reading result data written by said circuit unit at a first predetermined timing in accordance with normal program execution;
   a connection connecting said circuit unit with said processor;
   wherein said circuit unit receives said data from said processor, executes a predetermined operation in accordance with said data receiving, and writes said result of said operation data to said output memory after a second predetermined timing following said data receiving; and
   wherein said circuit unit stops writing result data to said output memory to prevent overwriting of old result data with said result data before said accessing of said output memory by said processor, when said processor does not access said output memory within said first predetermined timing.

2. A data processing device according to claim 1, wherein said processor is connected to receive an external signal and said circuit unit stops writing data to said memory in response to said external signal.

3. A data processing device according to claim 2, wherein said external signal is an interrupt signal instructing said processor to process an interrupt request.

4. A data processing device according to claim 2, wherein said connection is a bus and said external signal is a bus arbitration signal instructing said processor to temporarily disconnect said processor from said connection.

5. A data processing device, comprising:
   a circuit unit having an output memory;
   a processor connected with said circuit unit for transferring data to said circuit and for reading out result data from said output memory at a first predetermined timing; and
   a connection connecting said circuit unit with said processor,
   wherein said processor is connected to receive an interrupt signal,
   wherein said circuit unit receives said data from said processor, executes a predetermined operation and writes result data of said operation to said output memory after a second predetermined timing following said data receiving; and
   wherein said circuit unit stops writing to said output memory in response to said interrupt signal to prevent overwriting of old result data with said result data before said reading out of said old result data by said processor.

6. A data processing device according to claim 5, wherein said circuit unit writes data to said memory periodically, and,
   wherein said processor reads out the data from said memory periodically.

7. A data processing device according to claim 6, wherein said circuit unit writes data to said memory in synchronism with a clock signal, and,
   wherein said processor reads out the data from said memory in synchronism with said clock signal.

8. A data processing device according to claim 7, wherein said circuit unit stops an internal clock signal for synchronizing the writing to said memory.

9. A data processing device according to claim 5, wherein after said circuit unit stops writing data to said memory, said circuit unit resumes writing data to said memory when said processor accesses said memory.

10. A data processing device according to claim 5, wherein after said circuit unit stops writing data to said memory, said circuit unit resumes writing data to said memory when said circuit unit receives data from said processor.

11. A data processing device according to claim 5, further including an interrupt controller,
    wherein said interrupt controller is connected to receive an interrupt request signal and outputs said interrupt signal to said processor.

12. A data processing device according to claim 5, wherein said circuit unit includes a flip-flop circuit for enabling the writing of data to said memory in a first state, and for stopping the writing of data to said memory in a second state, and
    wherein said flip-flop circuit is brought into the second state by said interrupt signal.

13. A data processing device according to claim 5, wherein said circuit unit performs an operation and outputs results into an output register as said memory.

14. A data processing device according to claim 5, wherein said circuit unit and said processor are formed on a single semiconductor substrate.

15. A data processing device, comprising:

a circuit unit having an output memory, wherein said circuit unit receives data from a processor, executes a predetermined operation and writes result data of said operation to said output memory after a second predetermined timing following said data receiving;

said processor being connected with said circuit unit for transferring said data to said circuit unit and reading out result data from said output memory at a first predetermined timing;

a bus connecting said circuit unit with said processor; and a bus arbiter for selectively coupling and uncoupling said processor with said bus;

wherein said circuit unit stops writing result data to said output memory to prevent overwriting of old result data with said result data before said reading out of said old result data by said processor in response to said bus arbiter uncoupling said processor from said bus.

16. A data processing device according to claim 15, wherein said circuit unit writes data to said memory periodically, and, wherein said processor reads out the data from said memory periodically.

17. A data processing device according to claim 16, wherein said circuit unit writes data to said memory in synchronism with a clock signal, and, wherein said processor reads out the data from said memory in synchronism with said clock signal.

18. A data processing device according to claim 17, wherein said circuit unit stops an internal clock signal for synchronizing writing data to said memory.

19. A data processing device according to claim 15, wherein after said circuit unit stops the writing of data to said memory, said circuit unit resumes the writing of data to said memory when said bus arbiter couples said processor with said bus.

20. A data processing device according to claim 15, wherein said circuit unit includes a flip-flop circuit for enabling the writing of data to said memory in a first state, and for stopping the writing of data to said memory in a second state, and wherein said flip-flop circuit is brought into the second state in response to said bus arbiter uncoupling said processor from said bus.

21. A data processing device according to claim 15, wherein said circuit unit performs an operation and outputs results into an output register as said memory.

22. A data processing device according to claim 15, wherein said circuit unit and said processor are formed on a single semiconductor substrate.

23. A data processing device, comprising:

a circuit unit having an output memory for performing an operation, wherein said circuit unit receives data from a processor, executes a predetermined operation, and writes result data of said operation to said output memory each operation cycle;

a processor connected to said circuit unit for reading out said result data from said output memory at a first predetermined timing;

a connection connecting said circuit unit with said processor;

wherein said processor accesses said circuit unit for purposes including said reading out of said result data from said output memory, and wherein said circuit unit stops writing said result data to said output memory each said operation cycle unless said processor accesses said circuit unit.

24. A data processing device according to claim 23, wherein said circuit unit includes a counter circuit counting write intervals of said memory.

25. A data processing device according to claim 24, wherein said circuit unit includes a flip-flop circuit for enabling the writing of data to said memory in a first state, and for stopping the writing of data to said memory in a second state, and wherein said flip-flop circuit is brought into the second state in synchronism with a count-up of said write intervals by said counter circuit.

26. A data processing device according to claim 23, wherein said processor reads out the data from said memory each said operation cycle.

27. A data processing device according to claim 26, wherein said circuit unit writes data to said memory in synchronism with a clock signal, and, wherein said processor reads out the data from said memory in synchronism with said clock signal.

28. A data processing device according to claim 27, wherein said circuit unit stops an internal clock signal for synchronizing the writing of data to said memory.

29. A data processing device according to claim 23, wherein after said circuit unit stops the writing of data to said memory, said circuit unit can resume writing data to said memory when said processor reads out said data from said memory.

30. A data processing device according to claim 23, wherein after said circuit unit stops the writing of data to said memory, said circuit unit can resume writing data to said memory when said circuit unit receives a data from said processor.

31. A data processing device according to claim 23, wherein said circuit unit performs an operation and outputs results into an output register as said memory.

32. A data processing device according to claim 23, wherein said circuit unit and said processor are formed on a single semiconductor substrate.

33. A data processing device comprising:

a circuit unit having an output memory, said circuit unit performing an operation, receiving data from a processor unit, executing said operation to provide result data, and changing said result data in said output memory after a first predetermined timing following said data receiving;

said processor unit transferring said data to said circuit unit and reading said result data from said output memory at a second predetermined timing in accordance with normal program execution; and a connection for connecting said circuit unit with said processor unit, wherein said circuit unit stops said changing of said result data in said output memory to prevent changing of old result data to said result data before said reading by said processor unit, when said processor unit cannot read the result data from said output memory within said second predetermined timing.

34. A data processing device comprising:
a circuit unit having an output memory, said circuit unit performing an operation, receiving data from a processor unit, executing said operation to provide result data, and changing said result data in said output memory after a first predetermined timing following said receiving;
said processor unit frequently reading said result data from said output memory at a second predetermined timing; and
a connection for connecting said circuit unit with said processor unit,
wherein said circuit unit stops changing said result data in said output memory to prevent changing of old result data to said result data before said reading by said processor unit, when said processor unit is interrupted.

35. A data processing device comprising:
a circuit unit having an output memory performing an operation, receiving data from a processor unit, executing said operation to provide result data, and changing said result data in said output memory after a first predetermined timing following said receiving;
a bus;
said processor unit being connected to said circuit unit by said bus for, when said processor owns the bus, frequently reading said result data from said output memory at a second predetermined timing; and
wherein said circuit unit stops changing of said result data in said output memory to prevent changing of old result data to said result data before said reading by said processor unit of said old result data, when said processor unit aborts ownership of said bus.

36. A data processing device comprising:
a first circuit unit having an output memory, said circuit unit performing an operation, receiving data from a processor unit, executing said operation to provide result data, and changing said result data in said output memory after a first predetermined timing following said receiving;
said processor unit frequently reading said result data from said output memory at a second predetermined timing; and
a connection for connecting said first circuit unit with said processor unit,
wherein said first circuit unit includes a second circuit for stopping a change of said result data after each time of changing said result data.

37. A data processing device comprising:
a processor unit for executing instructions in synchronism with a clock signal; and
a special-purpose hardware module for performing an operation in synchronism with said clock signal and in association with said processor unit,
an output area for transferring result data by said operation,
wherein said processor unit transfers data to said special-purpose hardware module, after a first predetermined time, said processor unit reads said result data from said output area,
wherein said special-purpose hardware module receives said data from said processor unit, after a second predetermined time, said special-purpose hardware module outputs said result data to said output area, and
wherein said special-purpose hardware module stops an internal clock signal for synchronizing the operation each time the operation ends.

38. A mobile communication terminal device comprising:
a data processing unit for performing an operation of at least one of speech encoding/decoding processing, channel encoding/decoding processing and modulating/demodulating processing;
an analog front end unit; and
a radio frequency modulating/demodulating unit,
wherein said data processing unit includes:
a module having an output memory, receiving data from a processor, executing a predetermined operation to provide result data, and writing said result data to said output memory after a first predetermined time following said data receiving;
a connection connecting said module with said processor; and
said processor transferring said data to said module and reading out the result data from said output memory at a second predetermined timing in accordance with normal program execution,
wherein said module stops writing result data to said output memory when said processor does not read out the data from said memory within said second predetermined timing.

39. A mobile communication terminal device according to claim 38,
wherein said module performs waveform equalization for at least one of said speech encoding/decoding processing, channel encoding/decoding processing and modulating/demodulating processing.

40. A data processing device, comprising:
a circuit unit having an output memory;
a processor connected with said circuit unit and accessing said output memory at a first predetermined timing in accordance with normal program execution;
wherein said circuit unit receives data from said processor, executes a predetermined operation to provide result data, and writes said result data to said output memory after a second predetermined time following said data receiving; and
wherein said circuit unit stops writing said result data to said output memory to prevent writing of old result data over said result data before said accessing of said output memory by said processor, when said processor does not access said output memory within said first predetermined timing.

41. A data processing device, comprising:
a circuit unit having an output memory;
a processor connected with said circuit unit for transferring data to said circuit and reading out result data from said output memory at a first predetermined timing; and
wherein said processor is connected to receive an interrupt signal,
wherein said circuit unit receives said data from said processor, executes a predetermined operation to provide said result data, and writes said result data to said output memory after a second predetermined time following said data receiving; and
wherein said circuit unit stops writing said result data to said output memory in response to said interrupt signal.

42. A data processing device, comprising:
a circuit unit having an output memory for performing an operation, wherein said circuit unit receives data from a processor, executes said operation to provide result data, and writes said result data to said output memory each operation cycle;

a processor connected to said circuit unit for transferring said data to said circuit unit and reading out said result data from said memory;

wherein said processor accesses said circuit unit for purposes including said reading out of said result data from said output memory at a first predetermined timing, and wherein said circuit unit stops writing said result data to said output memory each said operation cycle unless said processor accesses said circuit unit.

* * * * *